United States Patent
Tang et al.

(10) Patent No.: US 7,659,353 B2
(45) Date of Patent: Feb. 9, 2010

(54) HYPERBRANCHED POLYMERS

(75) Inventors: Ben Zhong Tang, Hong Kong (CN); Kaitian Xu, Hong Kong (CN); Han Peng, Hong Kong (CN); Qunhui Sun, Hong Kong (CN); Jingdong Luo, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 11/088,135

(22) Filed: Mar. 22, 2005

(65) Prior Publication Data

US 2005/0164899 A1 Jul. 28, 2005

Related U.S. Application Data

(63) Continuation of application No. 10/109,316, filed on Mar. 28, 2002, now abandoned.

(51) Int. Cl.
*C08F 38/00* (2006.01)
*C08F 12/24* (2006.01)
*C08F 36/00* (2006.01)
*C08F 12/02* (2006.01)

(52) U.S. Cl. .................. 526/285; 526/346; 526/313; 526/335; 526/172

(58) Field of Classification Search ............... 526/285, 526/346, 313, 335, 172, 481

See application file for complete search history.

(56) References Cited

U.S. PATENT DOCUMENTS 5,576,375 A 11/1996 Olsen et al. .............. 524/481
5,594,058 A 1/1997 Olsen et al. .............. 524/481

OTHER PUBLICATIONS

Chalk et al., "A New Simple Synthesis of Soluble High Molecular Weight Polyphenylenes by the Cotrimerization of Mono- and Bifunctional Terminal Acetylenes," J. Polym. Scia, Part A-1, 10, 2033-43 (1972).*
Bracke, "Synthesis of Soluble, Branched Polyphenyls" J. Polym. Sci., Part A-1, 10, 2097-2101 (1972).*
Sergeyev et al. "Polycyclotrimerization of Dipropargyl Ethers and Mixtures of Them with Monopropyrgylethersr" Polym. Sci. U.S.S.R., 31(6), 1300-06 (1989).*
Srinrivasan et al. "Polymerization of Terminal Diynes by Niobium (V) Catalysts," Polym. Bull. 20, 359-64 (1988).*
Sun et al., "Copolycyclotrimerization of Mono- and Diynesj" Polym. Mater. Sci. & Eng., 82, 1 1 1-12 (2000).*

(Continued)

*Primary Examiner*—William K Cheung
(74) *Attorney, Agent, or Firm*—Schwabe, Williamson & Wyatt, P.C.

(57) ABSTRACT

A method for limiting the transmission of light through a material is disclosed. In the method, a layer composed of a hyperbranched polymer formed via a copolycyclotrimerization reaction is interposed between a light source and the material. Also provided is a method for emitting light comprising exciting the hyperbranched polymer. In addition, methods for limiting the transmission of light and for emitting light using hyperbranched polymers formed by homopolycyclotrimerization reactions are disclosed. A new class of hyperbranched polymers produced by copolycyclotrimerization is also disclosed.

15 Claims, 15 Drawing Sheets

OTHER PUBLICATIONS

Xu et al., "Synthesis of Stable and Luminescent Hyperbranched Polytalkenephenylenes) via Copolycyclotrimerization of Diynes and Monoynes," *Polym. Preprints*, 41(2), 1318-19 (2000).*

Office Action, mailed Apr. 20, 2004, for parent U.S. Appl. No. 10/109,316.

Final Office Action, mailed Nov. 23, 2004, for parent U.S. Appl. No. 10/109,316.

Chalk, A.J. and Gilbert, A.R., "A New Simple Synthesis of Soluble High Molecular Weight Polyphenylenes by the Cotrimerization of Mono- and Bifunctional Terminal Acetylenes," *J. Polym. Sci.*, Part A-1, 10, 2033-43 (1972).

Bracke, W., "Synthesis of Soluble, Brached Polyphenyls," *J. Polym. Sci.*, Part A-1, 10, 2097-2101 (1972).

Sergeyev et al., "Reactive Oligomers Based on the Polycyclotrimerization Reaction of Acetylene Compounds," *Appl. Polym. Symp.* 26, 237-48 (1975).

Srinrivasan, R. and Farona, M.F., "Polymerization of Terminal Diynes by Niobium(V) Catalysts," *Polym. Bull.* 20, 359-64 (1988).

Sun et al., "Evaluation of Branching Degree of Poly(alkenephenylenes) Prepared by Copolycyclotrimerization of Mono- and Diynes," *Polym. Mater. Sci. & Eng.*, 82, 113-14 (2000).

Xu et al., "Polycyclotrimerization of Internal Diynes: Synthesis of Hyperbranched Poly(alkenephenylenes)," *Polym. Preprints*, 41(2), 1245-46(2000).

Sun, et al., "Copolycyclotrimerization of Mono-and Diynes," *Polym. Mater. Sci. & Eng.*, 82, 111-12 (2000).

Sun et al., "Taming the Polycyclotrimerization of Diynes: Synthesis of Hyperbranched Poly(alkenephenylene)," *Polym. Preprints*, 41(1), 500-01(2000).

Xu et al., "Synthesis of Stable and Luminescent Hyperbranched Poly(alkenephenylenes) via Copolycyclotrimerization of Diynes and Monoynes," *Polym. Preprints*, 41(2), 1318-19 (2000).

Xu et al., "Polymerizations of Terminal and Internal Diynes," *Polym. Preprints*, 40(2), 820-21 (1999).

Xu et al., "Polycyclotrimerization of Diynes, a New Approach to Hyperbranched Polyphenylenes," *Chinese J. Polym. Sci.*, 17(4), 397-402 (1999).

* cited by examiner

HYPERBRANCHED POLYMERS

CROSS REFERENCE TO RELATED APPLICATIONS

This application is a continuation of U.S. patent application Ser. No. 10/109,316 filed Mar. 28, 2002, the entire disclosure of which is incorporated herein by reference.

FIELD OF THE INVENTION

The invention relates to hyperbranched polymers formed via polycyclotrimerization reactions, and methods for limiting the transmission of light or of emitting light involving the use of such polymers.

DESCRIPTION OF THE PRIOR ART

Cyclotrimerization reactions of alkynes were discovered by Berthelot in 1864. For example, three monofunctional alkynes may be reacted in the presence of a transition-metal catalyst in order to form a trifunctional benzene-based trimer, as shown in the following scheme:

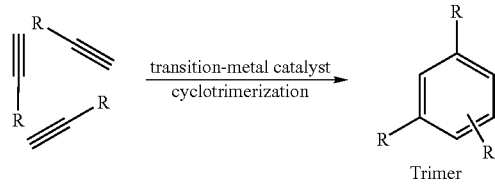

Although cyclotrimerization reactions have been intensively investigated, attention has mainly focused on low molecular weight compounds, such as cyclodimers and cyclotrimers. Up to now, there have only been a few scattered investigations concerning polymers of diynes prepared via polycyclotrimerization reactions.

Polycyclotrimerization reactions involve multifunctional monomers reacting to form macromolecular, hyperbranched polymer structures. For example:

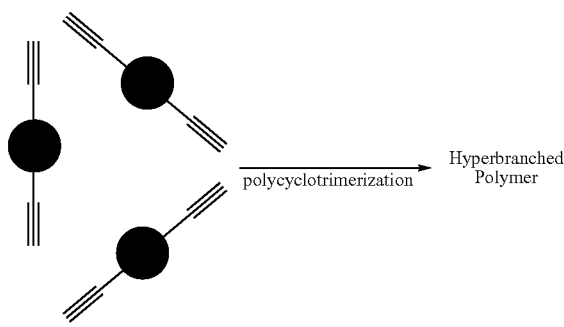

A variety of diynes are suitable for use in polycyclotrimerization reactions, with the central region between the two carbon-carbon triple bonds being, for example, a saturated, linear carbon chain.

The present inventors have investigated such reactions over the past few years. Reactions of this type where identical monomers are used are known as homopolycyclotrimerization reactions and are disclosed, for example, in earlier publication *Polymer Preprints,* 2000, Vol. 41(1), pp 500-501 (Xu et al). This paper specifically discloses the homopolycyclotrimerization of an aliphatic diyne, 1,8-nonadiyne, to form a hyperbranched poly(alkenephenylene). The polymer is highly thermally stable, showing a 5% weight loss at approximately 500° C.

Hyperbranched poly(alkenephenylenes) may also be produced via the reaction of a diyne and a monoyne. Reactions of this type are known as copolycyclotrimerization reactions. For example, earlier publication *Polymer Preprints,* 2000, Vol. 41(2), pp 1318-1319 (Xu et al) discloses the copolycyclotrimerization reactions of aliphatic diynes 1,7-octadiyne, 1,8-nonadiyne and 1,9-decadiyne with aliphatic monoynes such as 1-octyne. Again, the resulting polymers are described as thermally stable.

Hyperbranched polymers formed from aromatic monomers are also known, for example earlier publications *J. Poly. Sci.*, Vol. 10, pp 2033-2043 (Chalk et al) and pp 2097-2101 (Bracke) both relate to polymers formed via the copolycyclotrimerization of phenylacetylene and diethynylbenzene. The resulting, highly branched polymers are soluble in benzene and chlorinated solvents, and have high thermal stability.

U.S. Pat. No. 5,594,058 and U.S. Pat. No. 5,576,375 describe polyphenylene resins formed by copolycyclotrimerization reactions of vinylethynylbenzene, diethynylbenzene and, optionally, phenylacetylene. In both cases, polymerization is carried out under conditions which result in the retention of unreacted vinyl groups from the vinylethynylbenzene component. These vinyl groups are then susceptible to cross-linking. The polymers are described as useful in the formation of high-performance carbon-carbon composites, producing an unusually high char yield with advantageous handling and processing characteristics.

Thus, while hyperbranched polymer structures formed via co- and homo-polycyclotrimerization reactions are known, previous investigations have concentrated on their high chemical and thermal stability, high strength, good solubility and ease of processing.

The present invention seeks to provide hyperbranched polymers which can be used in a variety of new methods, as well as a range of new hyperbranched polymers per se.

SUMMARY OF THE INVENTION

According to a first embodiment of the present invention there is provided a method for limiting the transmission of light comprising interposing a layer composed of a hyperbranched polymer formed from copolycyclotrimerization of monomers of general formulae (I) and (II) between a light source and another material, wherein the monomers are:

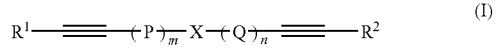

or salts thereof;

X is selected from the group consisting of linear or cyclic optionally substituted alkylene, and optionally substituted arylene or heteroarylene;

$R^1$, $R^2$, $R^3$ and Y are independently selected from the group consisting of optionally substituted, optionally interrupted linear or cyclic alkyl, and optionally substituted aryl or heteroaryl;

P and Q are independently selected from the group consisting of optionally substituted arylene or heteroarylene, optionally substituted linear or cyclic alkylene, and optionally substituted alkenylene of formula —$(CR^4=Z)_p$— or —$(Z=CR^4)_p$— where Z represents $CR^5$ or N, $R^4$ and $R^5$ each independently represent a hydrogen atom or an optionally substituted alkyl group, and $p \geq 1$;

and wherein m and n are independently 0, 1, 2 or 3.

A second embodiment of the invention provides a method for emitting light comprising exciting a hyperbranched polymer formed by copolycyclotrimerization of monomers of general formulae (I) and (II), wherein the monomers are:

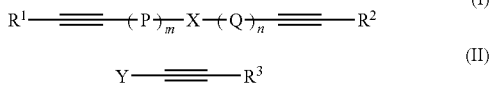

(I)

(II)

or salts thereof;

X is selected from the group consisting of linear or cyclic optionally substituted alkylene, and optionally substituted arylene or heteroarylene;

$R^1$, $R^2$, $R^3$ and Y are independently selected from the group consisting of optionally substituted, optionally interrupted linear or cyclic alkyl, and optionally substituted aryl or heteroaryl;

P and Q are independently selected from the group consisting of optionally substituted arylene or heteroarylene, optionally substituted linear or cyclic alkylene, and optionally substituted alkenylene of formula —$(CR^4=Z)_p$— or —$(Z=CR^4)_p$— where Z represents $CR^5$ or N, $R^4$ and $R^5$ each independently represent a hydrogen atom or an optionally substituted alkyl group, and $p \geq 1$;

and wherein m and n are independently 0, 1, 2 or 3.

Also, according to a third embodiment, the invention provides a method for limiting the transmission of light comprising interposing a layer composed of a hyperbranched polymer formed from homopolycyclotrimerization of monomers of general formula (I) between a light source and another material, wherein the monomers are:

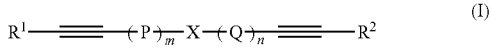 (I)

or salts thereof;

X is selected from the group consisting of linear or cyclic optionally substituted alkylene, and optionally substituted arylene or heteroarylene;

$R^1$ and $R^2$ are independently selected from the group consisting of optionally substituted, optionally interrupted linear or cyclic alkyl, and optionally substituted aryl or;

P and Q are independently selected from the group consisting of optionally substituted arylene or, optionally substituted linear or cyclic alkylene, and optionally substituted alkenylene of formula —$(CR^4=Z)_p$— or —$(Z=CR^4)_p$— where Z represents $CR^5$ or N, $R^4$ and $R^5$ each independently represent a hydrogen atom or an optionally substituted alkyl group, and $p \geq 1$;

and wherein m and n are independently 0, 1, 2 or 3.

A fourth embodiment of the invention provides a method for emitting light comprising exciting a hyperbranched polymer formed by homopolycyclotrimerization of monomers of general formula (I):

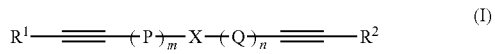 (I)

or salts thereof;

X is selected from the group consisting of linear or cyclic optionally substituted alkylene, and optionally substituted arylene or heteroarylene;

$R^1$ and $R^2$ are independently selected from the group consisting of optionally substituted, optionally interrupted linear or cyclic alkyl, and optionally substituted aryl or;

P and Q are independently selected from the group consisting of optionally substituted arylene or heteroarylene, optionally substituted linear or cyclic alkylene, and optionally substituted alkenylene of formula —$(CR^4=Z)_p$— or —$(Z=CR^4)_p$— where Z represents $CR^5$ or N, $R^4$ and $R^5$ each independently represent a hydrogen atom or an optionally substituted alkyl group, and $p \geq 1$;

and wherein m and n are independently 0, 1, 2 or 3.

A range of new hyperbranched polymer structures has also been developed and comprises a fifth embodiment of the invention. The hyperbranched polymer structures are produced by reaction of monomers having the following general formulae:

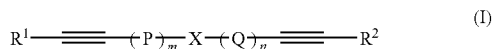 (I)

 (II)

or salts thereof;

wherein X is an optionally substituted arylene or heteroarylene;

$R^1$, $R^2$, $R^3$ and Y are independently selected from the group consisting of optionally substituted, optionally interrupted linear or cyclic alkyl, and optionally substituted aryl or heteroaryl;

P and Q are independently selected from the group consisting of optionally substituted arylene or heteroarylene, optionally substituted linear or cyclic alkylene, and optionally substituted alkenylene of formula —$(CR^4=Z)_p$— or —$(Z=CR^4)_p$— where Z represents $CR^5$ or N, $R^4$ and $R^5$ each independently represent a hydrogen atom or an optionally substituted alkyl group, and $p \geq 1$;

and wherein m and n are independently 0, 1, 2 or 3;

with the proviso that where X is a phenylene group or —$CH_2OC_6H_4OCH_2$—; $R^1$, $R^2$ and $R^3$ are all hydrogen; and n and m are both equal to 0, Y is other than unsubstituted phenyl or a vinyl-substituted phenyl.

DETAILED DESCRIPTION OF THE INVENTION

Figure 1:
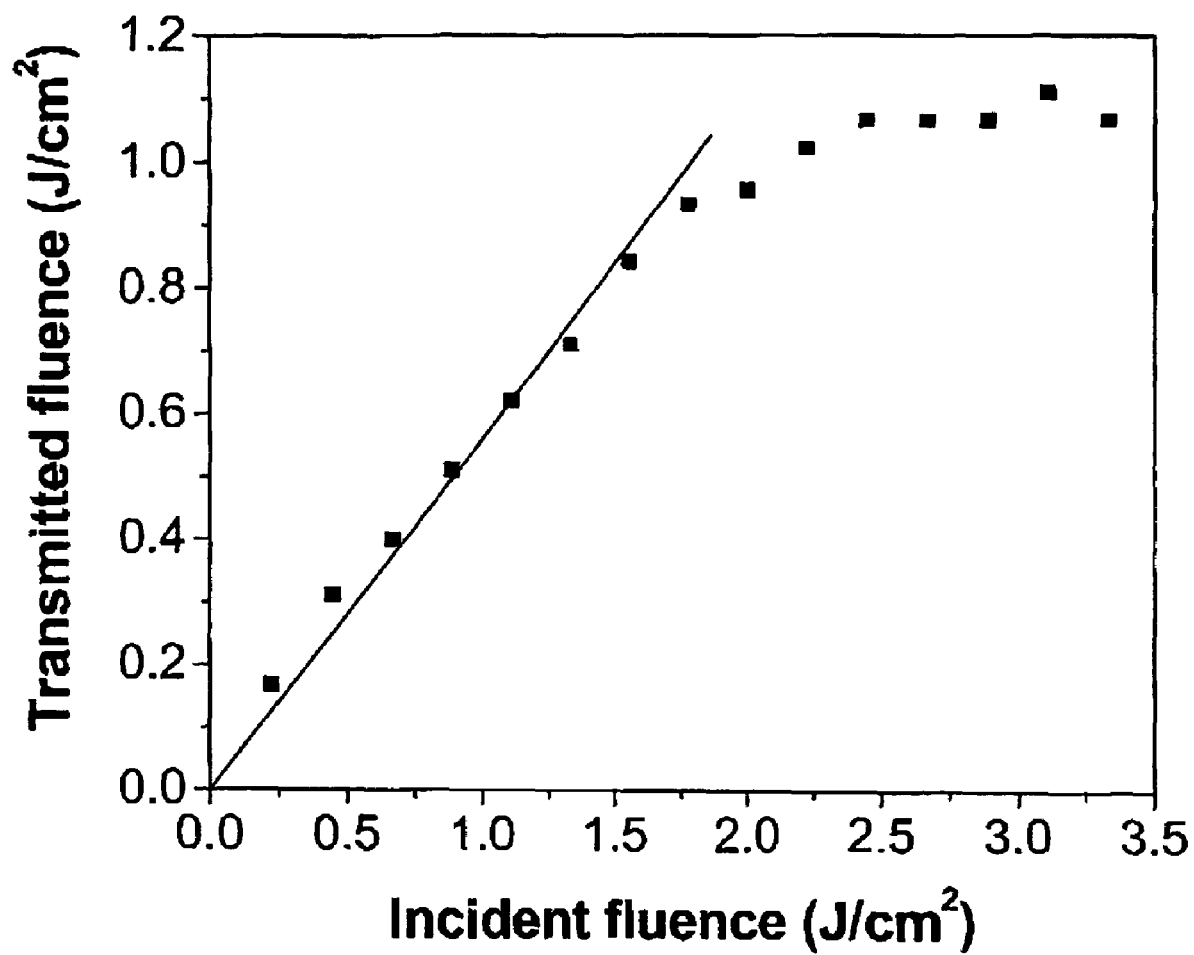
FIGS. 1-8 are graphs (transmitted fluence (J/cm$^2$) vs. incident fluence (J/cm$^2$)) illustrating the optical limiting properties of the hyperbranched polymers described herein, in accordance with the present invention.

The present invention, as defined in the five embodiments described briefly above, relates both to new methods involving known hyperbranched polymers, and to a range of new hyperbranched polymer structures per se. The novel hyperbranched polymer structures may also be employed in the same methods as the known hyperbranched polymers.

The new methods employing the hyperbranched polymers (both the known polymers and the novel polymers) will be discussed first, following which the structures of the polymers will be discussed.

The hyperbranched polymers which are the subject of this invention may be employed in a variety of methods for which they were previously unknown, such as optical limiting devices and light emitting devices (LEDs).

a) Optical Limiting Properties

Optical limiting materials show a non-linear transmittance of light, with transmission varying with the intensity of the incident radiation. Transmission is high at normal intensity, but low for intensive beams. Such materials are useful to protect, inter alia, optical elements, sensors, or the human eye.

The inventors have surprisingly found that hyperbranched polymer structures formed from copolycyclotrimerization reactions of diynes and monoynes, or homopolycyclotrimerization reactions of diynes alone exhibit good optical limiting properties, and may therefore be useful in optical limiting devices. For example, in order to limit the path of light, a layer of material comprising the hyperbranched polymers of the invention may be interposed between a light source and another material which is to be guarded from intense light (e.g. the human eye). The optical limiting properties of such hyperbranched polymer structures have never previously been known.

b) Light Emitting Properties

The development of blue-light emitting polymers has been the subject of intense academic and industrial research directed towards the fabrication of full colour organic displays. However, as yet no organic polymer fully meets the desired criteria of long-term stability, high efficiency, and bright blue emission that are essential for commercially viable light emitting diodes (LEDs). So far, the majority of work on polymer LEDs has been focused on linear, one-dimensional polymers. Although a few three-dimensional conjugated polymers, such as hyperbranched polymers, have been reported to exhibit charge transferring and processing properties comparable to those of their linear counterparts, three-dimensional light-emitting materials have been less discussed in the literature.

Conventional linear polymers, such as poly(p-phenylenevinylene)s have a strong tendency to form aggregates due to the interchain π-stacking, and the resultant red-shifted and less efficient emission restricts the potential applications of these molecules. Also, while poly(p-phenylene) (PPP), a thermally robust conjugated polymer, has attracted much attention as a promising candidate for use in the construction of blue LEDs, its comparatively low solubility in organic solvents precludes the formation of a high molecular weight polymer. Thus, low solubility of known organic materials restricts their potential applications as advance materials such as in LEDs.

A series of hyperbranched polymers has now been synthesised via copolycyclotrimerization of diynes with monoynes or via homopolycyclotrimerization of diynes alone, and it has been found that such hyperbranched structures display unexpected light emitting properties such as high luminescence efficiency, as well as good solubility and excellent thermal stability. These properties make the polymers useful in methods for emitting light, emitting light at wavelengths of between 350 and 700 nm, more preferably between 380 and 450 nm (i.e. blue/violet light). For example, the hyperbranched structures have been shown to emit strong deep-blue light at ~400 nm while remaining thermally stable, and emit light of an intensity greater than that emitted by poly(1-phenyl-1-octyne), a well-known highly luminescent disubstituted polyacetylene. The high efficiency and bright blue emission of the polymers makes them good candidates for commercially-viable blue LEDs.

In addition, thin films of the polymers may be produced, and surprisingly show little aggregate formation. This is in contrast to macromolecular chromophores in other polymers, which often aggregate to form less or non-emissive species such as excimers, whose luminescence spectra are normally red-shifted in comparison to those of the polymer solutions. Such shifts are clearly detrimental when the polymers are utilised as thin films in LED applications. However, thin films of polymers of the invention show photoluminescence spectra similar to those of the polymer solutions, with little or no decrease in emission intensity or red-shift in emission peaks, indicating little aggregation.

In summary, the combination of the optical-limiting and light-emitting properties described above with the previously known properties (e.g. excellent solubility and processability; high thermal stability; tuneable composition and properties (e.g. by changing the monomers and their respective concentrations)) makes the hyperbranched polymers desirable for use in a number of applications. For example, they can be used in high performance composites, thermally stable coatings, light emitting devices and optical limiting devices, or as surface modifiers, tougheners, additives, viscosity reducing agents, and in other industrial applications.

Having discussed technical areas in which the hyperbranched polymers may be employed, their structures will now be considered in more detail. The following list of possible functional groups, substituents and interrupting groups are those which are generally applicable to the invention. Particularly preferred groups, substituents and interrupting groups in each of the three embodiments will be described later.

When used to describe the monomers used in the homopolycyclotrimerization and copolycyclotrimerization reactions above, alkyl and alkylene represent a monovalent alkyl or a divalent alkylene group respectively, either of which may be linear or cyclic, may be straight-chain or branched, and may contain up to 20 carbon atoms.

When alkyl represents a linear, uninterrupted group, it preferably contains from 3 to 10, more preferably from 3 to 6 carbon atoms. When alkyl represents a linear, interrupted group, it preferably contains between 2 and 20 carbon atoms, especially between 5 and 16 carbon atoms. When alkyl represents a cyclic group, it preferably contains from 3 to 10, more preferably from 3 to 8, most preferably from 3 to 6 carbon atoms. Some preferred cyclic alkyl (cycloalkyl) groups include cyclopropyl, cyclobutyl, cyclopentyl, cyclohexyl, cycloheptyl and cyclooctyl groups, as well as the cycloalkyl group formed by removal of one hydrogen atom from decalin or cholestryl.

When alkylene represents a linear group, it preferably contains from 1 to 12 carbon atoms, more preferably between 3 and 8 carbon atoms. When alkylene represents a cyclic group, it preferably contains from 3 to 10, more preferably from 3 to 8, most preferably from 3 to 6 carbon atoms. Some preferred cyclic alkylene (cycloalkylene) groups include cyclopropylene, cyclobutylene, cyclopentylene, cyclohexylene, cycloheptylene and cyclooctylene, as well as the cycloalkylene group formed by removal of two hydrogen atoms from decalin or cholestryl.

Alkenyl and alkenylene represent a monovalent alkenyl or a divalent alkenylene group respectively, either of which may be straight-chain or branched, linear or cyclic, and may contain from 2 to 20 carbon atoms. When they represent a linear group, they preferably contain from 2 to 6, more preferably from 2 to 4, most preferably 2 carbon atoms. When they represent a cyclic group, they preferably contain from 5 to 8 carbon atoms.

Aryl or arylene represent a monovalent aryl or divalent arylene group respectively, comprising at least one aromatic ring, either of which may contain from 5 to 18, preferably from 6 to 14, more preferably from 6 to 10, and most preferably 6 carbon atoms. Typical aryl groups include phenyl, naphthyl, phenanthryl, anthracyl, indenyl, azulenyl, biphenylenyl, and fluorenyl groups. Particularly preferred aryl groups are phenyl, naphthyl and fluorenyl. Typical arylene groups include phenylene, naphthylene, phenanthrenylene, anthracenylene, indenylene, azulenylene, biphenylenylene and fluorenylene groups. Particularly preferred arylene groups include phenylene, biphenylene, naphthylene, fluorenylene, anthracenylene and phenanthrenylene.

Heteroaryl or heteroarylene represent a monovalent heteroaryl or divalent heteroarylene group respectively, either of which may contain from 3 to 14 ring atoms and 1, 2 or 3 heteroatoms selected from oxygen, nitrogen and sulphur atoms. Examples of heteroaryl groups are thienyl, benzothienyl, naphthothienyl, thianthrenyl, furyl, pyranyl, isobenzofuranyl, chromenyl, xanthenyl, phenoxathiinyl, pyrrolyl, imidazolyl, pyrazolyl, pyridyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinazolinyl, cinnolinyl, pteridinyl, carbazolyl, carbonlinyl, phenanthridinyl, acridinyl, perimidinyl, phenanthrolinyl, phenazinyl, isothiazolyl, phenothiazinyl, isoxazolyl, furazanyl and phenoxazinyl. Particularly preferred heteroaryl groups include carbazyl and thienyl.

Examples of heteroarylene groups include the divalent derivatives of the heteroaryl groups listed above (i.e. the heteroaryl groups listed above having a further hydrogen atom removed in order to form a divalent group). Particularly preferred heteroarylene groups include thienylene, carbazylene, pyrenylene and pyridylene.

Where any of the groups defined above are described as being optionally substituted, the substituent groups may include halogen atoms, hydroxy, cyano, amino, silyl, nitro, alkyl, cycloalkyl, haloalkyl, cycloalkyloxy, alkoxy, haloalkoxy, formyl, alkoxycarbonyl, carboxyl, alkanoyl, alkylthio, alkylsulphinyl, alkylsulphonyl, alkylsulphonato, aryl, arylalkyl, alkaryl, aryloxy, arylsulphinyl, arylsulphonyl, arylsulphonato, carbamoyl, carbamido, alkylamido, alkenyl, alkenyloxy and alkynyl, as well as heterocyclic groups. When the substituent group is silyl, the silicon atom is preferably substituted with hydrogen, a $C_1$-$C_6$ alkyl group, or a phenyl group. Particularly preferred groups include trimethylsilyl and dimethylphenylsilyl.

Where any of the groups defined above are described as being optionally interrupted, this means that functional groups are present as interruptions in the carbon backbone. Interrupting groups include atoms such as oxygen or sulphur, or functional groups which are divalent radicals derived from groups such as amino, silyl, cyano, amido, formyl, alkoxycarbonyl, carboxy, alkanoyl, alkylthio, cycloalkyl, haloalkyl, cycloalkyloxy, alkoxy, haloalkoxy, alkylsulphinyl, alkylsulphonyl, alkylsulphonato, aryl, arylalkyl, alkaryl, aryloxy, arylsulphinyl, arylsulphonyl, arylsulphonato, carbamoyl, carbamido, alkylamido, alkenyl, alkenyloxy and alkynyl, as well as heterocyclic groups. When the interrupting group is a silyl group, the silicon atom is preferably substituted with hydrogen, a $C_1$-$C_6$ alkyl group or a phenyl group. A particularly preferred group is —Si(Me)$_2$—.

When used to describe an optional substituent or an optional interrupting group, or when forming a part of the conjugate substituent or interrupting groups described above (e.g. when forming the alkyl part of an alkylamido group), alkyl preferably represents a straight-chain or branched alkyl group having from 1 to 15, more preferably 1 to 10, most preferably 1 to 6 carbon atoms. Typical alkyl groups include methyl, ethyl, propyl, isopropyl, butyl, sec-butyl and tert-butyl, with methyl, ethyl and propyl being especially preferred.

When used to describe an optional substituent or an optional interrupting group, cycloalkyl preferably represents a cyclic alkyl group having from 3 to 8, preferably 3 to 6 carbon atoms. Cyclohexyl is particularly preferred.

When used to describe an optional substituent or an optional interrupting group, alkenyl preferably represents a straight-chain or branched alkenyl group having from 2 to 6, more preferably from 2 to 4, carbon atoms. Typical alkenyl groups include vinyl, allyl, 1-butenyl, 2-butenyl, 3-butenyl, and isobutenyl groups, with vinyl being especially preferred.

When used to describe an optional substituent or optional interrupting group, aryl is preferably an aryl group containing from 5 to 18, preferably from 6 to 14, more preferably from 6 to 10, and most preferably 6 carbon atoms. Particularly preferred aryl groups include phenyl and biphenyl.

Alkynyl typically represents an alkynyl group having from 2 to 6, more preferably from 2 to 4, carbon atoms. Typical alkynyl groups include propargyl, 1-propynyl, 2-propynyl, 1-butynyl, 2-butynyl, and 3-butynyl.

Heterocyclic represents groups having between 3 and 10 carbon atoms and having one or more 4, 5, 6 or 7 member saturated or unsaturated rings containing 1, 2 or 3 oxygen, nitrogen or sulphur atoms. Examples of heterocycles include tetrahydrofuran, 1,4-dioxane, 1,3,5-trioxane, pyrrolidine, piperidine, piperazine, imadazoline, isoindoline, chromane, isochromane, pyrazolidine, quinuclidine, pyridine, pyrrole, oxazole, indole, purine, pyrimidine, 1,3-dithiane, azetidine, tetrahydropyran, imidazole, thiazole, isoxazole, pyrazole, quinoline, cytosine, thymine, uracil, adenine, guanine, pyrazine, picolinic acid, picoline, furoic acid, furfural, furfuryl alcohol, carbazole, isoquinoline, 3-pyrroline, thiophene, furan, hexamethyleneimine, $\epsilon$-caprolactone, $\epsilon$-caprolactam, omega-thiocaprolactam and morpholine.

Alkaryl represents any of the aryl groups defined above substituted by one or more alkyl groups.

Aralkyl represents any of the alkyl groups defined above substituted by one or more aryl groups.

Halo represents a chlorine, fluorine, bromine or iodine atom. A group containing a halo group, e.g. haloalkyl, may contain one or more of these halogen atoms.

Typical haloalkyl groups include $C_1$-$C_4$ alkyl groups substituted by one or more of fluorine, chlorine, bromine, or iodine atoms, e.g. fluoromethyl, difluoromethyl, trifluoromethyl, pentafluoroethyl, 1,1-difluoroethyl, and trichloromethyl groups.

Alkoxy, alkenyloxy, aryloxy and cycloalkyloxy represent any of the alkyl, alkenyl, aryl and cycloalkyl groups respectively as described above and linked by an oxygen.

Alkoxycarbonyl represents the group —C(O)OR, where R is hydrogen or any of the alkyl groups described above.

Haloalkoxy represents any of the alkoxy groups described above and substituted by one or more fluoro, chloro, bromo, or iodo groups, e.g. trifluoromethoxy, trichloromethoxy, 2-chloroethoxy, 2-bromoethoxy, pentafluoroethyl, 3,3,3-trichloropropoxy and 4,4,4-trichlorobutoxy.

Typical amino groups include $NH_2$, NHR, and NRR', wherein R and R' are $C_1$-$C_4$ alkyl groups.

Carbamido represents groups of the formula —NHC(O)$NH_2$. Carbamoyl represents groups of the formula —C(O)$NH_2$.

Alkanoyl represents any of the alkyl groups described above and linked by a carbonyl group, i.e. —C(O)R, where R is alkyl.

Alkylthio represents an alkyl group as described above linked by a sulphur atom.

Alkylamido represents an alkyl group as described above and linked by an amido group, for example —C(O)NRR', where at least one of R and R' is a $C_1$-$C_4$ alkyl group.

Alkylsulphinyl and arylsulphinyl represent an alkyl group or an aryl group respectively and as described above, being linked by a sulphinyl, i.e. —S(O)—, group.

Alkylsulphonyl and arylsulphonyl represent an alkyl group or an aryl group respectively and as described above, being linked by a sulphonyl, i.e. —$SO_2$—, group.

Alkylsulphonato and arylsulphonato represent an alkyl group or an aryl group respectively and as described above, being linked by a sulphonato, i.e. —$SO_2$—O—, group.

When monomers are described as being according to general formulae (I) or (II), also encompassed are the salts (e.g. organic or metallic salts) of such compounds. Suitable salts will be known to those skilled in the art. For example, when the monomer is basic (e.g. when $R^1$, $R^2$, $R^3$ or Y are amines of formula —$NH_2$, —NHR or —NRR'), salts include compounds such as hydrochloride salts. One possible commercially available monomer within the scope of the invention is propargylamine hydrochloride, formed from quaternization of the amine group and having the formula HC≡$CCH_2NH_2$.HCl. Alternatively, when the monomers are acids (e.g. where $R^1$, $R^2$, $R^3$ or Y contain —COOH as a terminal group), the monomers may be present as metal salts, for example as sodium, potassium, calcium or magnesium salts thereof.

Each of the three embodiments of the invention will now be described separately in more detail.

The first and second embodiments of the invention relate to methods employing polymers formed via the copolycyclotrimerization of a diyne and a monoyne as defined above. Suitable monomers for use in these embodiments include those containing, as the X and Y groups, purely aliphatic groups, purely aromatic groups, or a mixture of the two.

X may be a linear or cyclic optionally substituted alkylene group, preferably having the general formula —$(CH_2)_k$— where k is an integer between 1 and 12, preferably between 3 and 8. When X is such a group, the other groups (including P, Q and Y) may also contain aliphatic groups, or may alternatively contain aromatic moieties, such as phenyl rings. However, it is preferred that when X has the general formula —$(CH_2)_k$—, m and n are zero, thus neither P nor Q are present.

Alternatively, X may be an optionally substituted arylene or heteroarylene group, for example one selected from phenylene, biphenylene, naphthylene, fluorenylene, anthracenylene, phenanthrenylene, thienylene, carbazylene, pyrenylene and pyridylene. When X is a phenylene group, a preferred polymer structure is produced when one of m or n is one, and the other is zero, such that one of the groups, P or Q, is present. In this case, it is preferred if the one of P or Q which is present, is a phenylene group.

If X is a substituted arylene or heteroarylene group, it is preferably substituted by one or more $C_1$-$C_{10}$ alkyl groups. For example, some preferred groups include a phenylene group substituted by between 1 and 4, preferably 4, methyl groups; a fluorenylene group substituted at the 9-position by two alkyl groups, preferably $C_1$-$C_8$, more preferably $C_1$-$C_6$, most preferably $C_6$ alkyl groups; or a carbazylene substituted on the nitrogen atom by an alkyl group which is preferably a $C_1$-$C_{16}$, more preferably a $C_{11}$ alkyl group.

When X is an arylene or a heteroarylene group, it will be attached to P and Q (or, in their absence, to the two carbon-carbon triple bonds) by any suitable attachment points. For example, a phenylene group may be attached at any two carbon atoms, but is preferably in a 1,4-conformation (i.e. attached at two carbon atoms which are opposite to each other in the ring). A fluorenylene group will be similarly attached at two convenient carbon atoms, but is preferably attached at either the 2 and 7, or the 3 and 6 positions.

In preferred embodiments, X is selected from the following specific groups: 1,4-phenylene, 1,4-(2,3,5,6-tetramethyl)phenylene, 4,4'-biphenylene, 2,7-fluorenylene, 3,6-fluorenylene, 2,7-[9,9-bis(n-hexyl)]fluorenylene, 3,6-[9,9-bis(n-hexyl)]fluorenylene, 3,6-(N-hexyl)carbazylene, 3,6-(N-undecyl)carbazylene, 2,7-(N-hexyl)carbazylene and 2,7-(N-undecyl)carbazylene.

Similarly to X, Y may be an aliphatic or an aromatic group. In one embodiment, Y is an optionally interrupted, optionally substituted alkyl group, preferably having from 1 to 20 carbon atoms. If Y is an uninterrupted group, it preferably contains from 3 to 10 carbon atoms in its carbon backbone. When Y is an uninterrupted but substituted group, it may be substituted by any of the optional substituents described above. However, it is preferred that Y is substituted with a functional group selected from aryl, aryloxy and heterocyclic groups.

In another preferred embodiment, Y is a linear alkyl group having between 1 and 20 carbon atoms, and being interrupted by a group of the general formula:

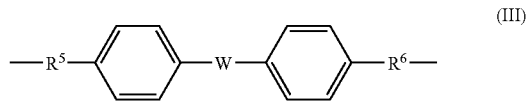

(III)

wherein W represents a carbon-carbon single bond or a group of the formula —C(O)—O— or —O—C(O)—; and $R^5$ and $R^6$ independently represent —O—, —C(O)—, —C(O)—O—, —O—C(O)— or a group of the formula —C(O)—O—$(CH_2)_h$—O—$(CO)_i$— where h is an integer between 1 and 10, and i is 0 or 1. Y is more preferably interrupted by one of the following groups:

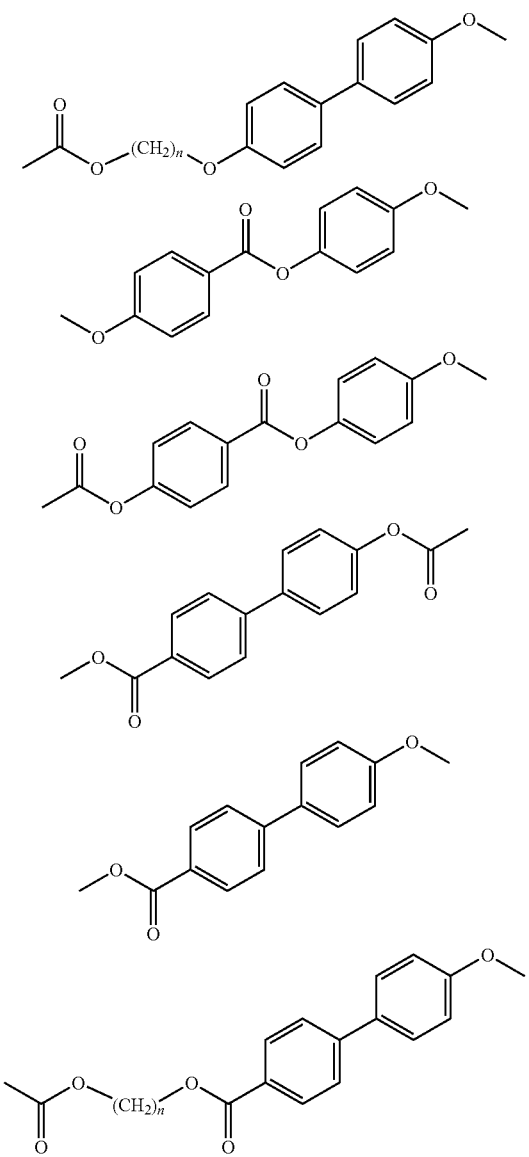

In these formulae, h is an integer between 1 and 10, and is preferably 6.

Alternatively, when Y is not an aliphatic group, it may be an optionally substituted aryl or heteroaryl group. The aromatic ring(s) is(are) preferably selected from phenyl, naphthyl, flurorenyl, anthracenyl, phenanthrenyl, carbazolyl, thienyl, pyrrolyl or pyridinyl groups, with phenyl and naphthyl being particularly preferred.

The numbers m and n may be zero, 1, 2 or 3, although in some instances it is preferred that at least one of m or n is 1. In this case it is preferred that P and/or Q are optionally substituted aryl or heteroaryl groups. In a preferred case, m is 1 and n is zero, and P is phenylene. Alternatively, m is zero and n is one, with Q being phenylene. These two alternatives are particularly preferred when X is a single phenylene group. However, the most preferred arrangement is where m and n are both zero.

$R^1$, $R^2$ and $R^3$ can be aliphatic or aromatic groups, as defined in the first definition of this embodiment. However, it is generally preferred that they are independently selected from hydrogen and optionally interrupted $C_1$-$C_6$ alkyl groups. A preferred example of an interrupted $C_1$-$C_6$ alkyl group is a trimethylsilyl group, which can be considered as a methyl group which is interrupted by a —Si(Me)$_2$— group. Other preferred examples of $R^1$, $R^2$ and $R^3$ groups include hydrogen, methyl, ethyl and propyl, with hydrogen being particularly preferred for each of these R groups.

The third and fourth embodiments of the invention relates to methods employing polymers formed via the homopolycyclotrimerization of a diyne. In these embodiments the diyne is defined in the same way as in the first embodiment above, with the preferred X, P, Q, $R^1$ and $R^2$ groups and the preferred values of m and n being as for the first and second embodiments. However, it is particularly preferred in the third and fourth embodiments that m and n are both zero, $R^1$ and $R^2$ are both hydrogen, and X is selected from phenylene and groups having the general formula —(CH$_2$)$_j$— where j is an integer between 2 and 15, preferably between 3 and 9. The most preferable values of j are odd integers between 3 and 9, i.e. j=3, 5, 7 or 9.

According to the fifth embodiment of the invention, there is provided a range of new polymers formed via the copolycyclotrimerization of a diyne and a monoyne, where the diyne contains at least one aromatic ring between the two carbon-carbon triple bonds. The preferred X, Y, P, Q, $R^1$, $R^2$ and $R^3$ groups and the preferred values of m and n are the same as those in the first embodiment, but with the requirement that the X group is an optionally substituted arylene or heteroarylene group.

However, in particularly preferred cases, X is selected from phenylene, biphenylene, fluorenylene or thiophenylene. It is also preferred that Y is either phenyl, or —(CH$_2$)$_h$CH$_3$ where h is an integer between 1 and 10, preferably between 3 and 9.

The hyperbranched polymer structures according to this fifth embodiment of the invention are, like those defined in the other embodiments, suitable for use as optical limiters or light-emitting materials. For example, the hyperbranched polymers according to this embodiment emit ultra-violet light at a wavelength around 400 nm, making them useful for light-emitting applications. The emission colour can be tuned by changing the molecular structure of the polymer.

The polymers can be made by any conventional process known to the person skilled in the art. Particularly suitable processes are disclosed in earlier papers, *Polymer Preprints*, 2000, 41(2), pp 1245-1246 and pp 1318-1319 (both Xu et al).

Monomers for use in these processes may be commercially available. For example, suitable commercially available monomers include monomers of the general formula HC≡C—(CH$_2$)$_m$—C≡CH, where m=2, 4, 6, 8, 10, 12, 16, acetylenedicarboxylic acid, 1,3-bis(trimethylsilylethynyl) benzene, 1,4-bis(trimethylsilylethynyl)benzene, 3-butyn-1-ol, 3-butynoic acid, 2-butyne-1,4-diol, 3-cyclohexyl-1-propyne, 5-chloro-1-pentyne, 5-cyano-1-pentyne, 1,1-diphenyl-2-propyn-1-ol, 1,4-dichloro-2-butyne, 1-dimethylamino-2-propyne, 3,3-dimethyl-1-butyne, diphenylacetylene, 1,4-dichloro-2-butyne, 1,9-decadiyne, 1-ethynyl-1-cyclohexanol, 1-ethynylcyclohexene, 1-ethynylcyclohexylamine, 17α-ethynylestradiol, 2-ethynylpyridine, 3-ethyl-1-heptyn-3-ol, 4-ethynyltoluene, 9-ethynyl-9-fluoroenol, ethyl propiolate, 5-hexyn-1-ol, 5-hexynenitrile, 5-hexynoic acid, 7-hexadecyn-1-ol, 5-hexyn-1-ol, 1,6-heptadiyne, 2-methyl-1-buten-3-yne, 2-methyl-3-butyn-2-ol, 3-methyl-1-pentyn-3-ol, methyl phenylpropiolate, 1,8-nonadiyne, 3-nonyn-1-ol, 1-octyne, 3-octyn-1-ol, 1-phenyl-1-butyne, 1-butynylbenzene, 1-phenyl-1-propyne, 1-phenyl-2-(trimethylsilyl)acetylene, 1-phenyl-2- propyn-1-ol, 1-propynyl-1-cyclohexanol, 3-pentyn-1-ol, 4-pentyne-1-ol, 4-pentynoic acid, 4-phenyl-1-butyne, phenylacetylene, propargyl alcohol, propargyl benzenesulfonate, propargyl chloride, propargylamine hydrochloride, propiolic acid, 3-pentynoic acid, 4-pentyn-1-ol, triethylsilyl)acetylene, (triisopropylsilyl)acetylene, (triphenylsilyl)acetylene, 1,1,3-triphenylpropargyl alcohol, 1-(trimethylsilyl)-1-propyne, 1-trimethylsilyl-1-hexyne, 10-undecynoic acid, 10-undecyn-1-ol and 3,9-dodecadiyne. Alternatively, the monomers may be prepared from commercially available starting materials by conventional processes. For instance, the monomer 4,4'-diethynylbiphenyl may be prepared according to the synthesis shown in Example 4 below.

A transition metal catalyst is used in the processes for preparing the hyperbranched polymers. Suitable catalysts include those having, as the transition metal, niobium, tantalum, molybdenum, tungsten, cobalt, nickel, zinc, rhodium, palladium, ruthenium and iridium. Specific transition metal complexes useful in the processes include $NbCl_5$ and $TaCl_5$, both of which may be used with or without $Ph_4Sn$ as a cocatalyst; $[Mo(CO)_3cp]_2$; $[W(CO)_3cp]_2$, $Co(CO)_2cp$ and $Co_2(CO)_8$. Of these, $NbCl_5$, $TaCl_5$, $Co(CO)_2cp$ and $Co_2(CO)_8$ are preferred. When $Co(CO)_2cp$ is used, it can be activated with UV radiation.

The following Examples are intended to illustrate the present invention, and are not intended to limit the invention in any way.

EXAMPLES

Examples 1 to 9

Examples 1 to 9 describe synthetic routes to produce hyperbranched polymers according to the teaching of the invention. The synthetic routes encompass a range of different diynes and monoynes, and describe both homopolycyclotrimerization and copolycyclotrimerization reactions.

Example 1

This example demonstrates the preparation of a hyperbranched polymer via homopolycyclotrimerization of a diyne according to the following general scheme:

SCHEME 1

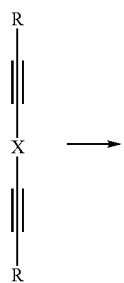

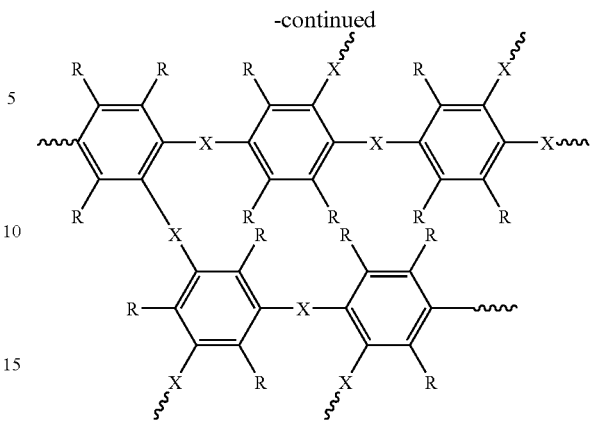

Scheme 1 represents a scheme according to the third and fourth embodiments of the invention where $R^1$ and $R^2$ are the same (and are represented by "R"), and m and n are both zero (so P and Q are absent). In this specific example, X is a —$(CH_2)_5$— group, and R is methyl (i.e. the monomer is 2,9-undecadiyne).

Method:

To a well baked Schlenk tube, 18.0 mg of $TaCl_5$ (0.05 mmol) and 21.3 mg $Ph_4Sn$ (0.05 mmol) were added under an inert atmosphere in a glovebox. The catalysts were mixed with 2.0 mL freshly distilled toluene and aged at room temperature for 15 minutes. A solution of 0.2 mL 2,9-undecadiyne (160 mg, 1.08 mmol) in 2.8 mL toluene was then added dropwise via a syringe over 3-5 minutes under stirring. An immediate exothermic reaction took place and the colour of the reaction mixture changed from light yellow to deep brown. After stirring at room temperature for 2 hours, the reaction was quenched by the addition of a small amount of methanol. The polymer solution was dropped into 150 mL methanol via a cotton filter while stirring. The precipitated polymer was then allowed to stand in methanol overnight, decanted gently, washed with methanol several times, and dried in a vacuum at room temperature to a constant weight. The yield was 132.0 mg (82.5%), and the product was a colourless powder which was completely soluble in solvents such as toluene, dichloromethane, chloroform and THF. TGA analysis (performed on a Perkin Elmer TGA 7 at a heating rate of 20° C./min under nitrogen) shows that the resulting polymer possesses high thermal stability, having a 5% weight loss at 480° C.

While this method has been described using 2,9-undecadiyne as the diyne, it is equally applicable to other monomers. For example 3,9-dodecadiyne has also been used in the method described above in order to form a hyperbranched polymer. The method is also suitable for the homopolycyclotrimerization of terminal diynes.

Example 2

This example demonstrates the preparation of a hyperbranched polymer via copolycyclotrimerization of a diyne with a monoyne, as shown in the following general scheme:

SCHEME 2

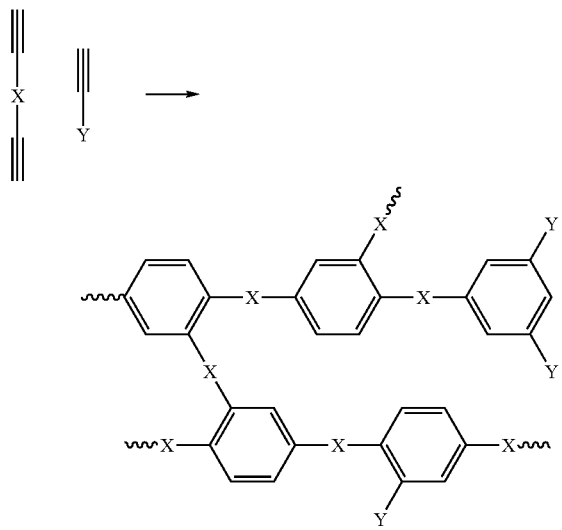

Scheme 2 represents a scheme according to the first, second and fifth embodiments of the invention where $R^1$, $R^2$ and $R^3$ are all hydrogen, and m and n are both zero (so P and Q are absent). In the specific example below, the X group is —$(CH_2)_4$— (i.e. the diyne is 1,7-octadiyne) and the Y group is:

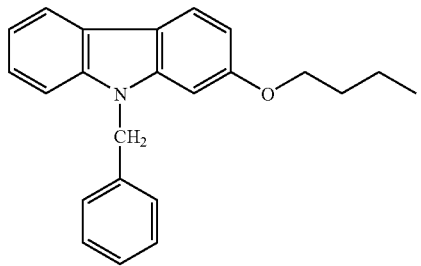

The monoyne is therefore described as a carbazole-containing monoacetylene (CzA).

Method:

To a thoroughly baked and moisture excluded Schlenk tube, 18.0 mg of $TaCl_5$ (0.05 mmol) and 21.3 mg $Ph_4Sn$ (0.05 mmol) were added under an inert atmosphere in a glovebox. The catalysts were mixed with 1.0 mL freshly distilled toluene and aged at room temperature for 15 minutes. A mixture solution of 0.2 mL (160 mg, 1.51 mmol) 1,7-octadiyne and 30 mg (0.09 mmol) carbazole-containing monoacetylene (CzA, see below) in 1.3 mL toluene prepared in another dry tube was then added dropwise via a syringe over 3-5 minutes under stirring. An immediate exothermic reaction took place and the colour of the reaction mixture changed from light yellow to dark brown. After stirring at room temperature for 12 hours, the reaction was quenched by the addition of a small amount of methanol. The polymer solution was dropped into 150 mL methanol via a cotton filter under stirring. The precipitated polymer was then allowed to stand in methanol overnight, and then the methanol was decanted gently. The polymer was isolated, washed with methanol several times, and dried in a vacuum at room temperature to a constant weight. The yield was 128 mg (67%) and the product was a light grey powder which was completely soluble in solvents such as toluene, dichloromethane, chloroform and THF.

While this method has been described using 1,7-octadiyne as the diyne and CzA as the monoyne, it is equally applicable to other monomers. For example 1,8-nonadiyne and 1,9-decadiyne have also been used as the diynes, and 1-octyne and phenylacetylene have all been used as the monoynes in order to form hyperbranched polymers.

Example 3

This example describes the production of a diyne (1,4-diethynylbenzene) followed by copolycyclotrimerization of the diyne with a monoyne(phenylacetylene). The general reaction scheme is shown below:

SCHEME 3

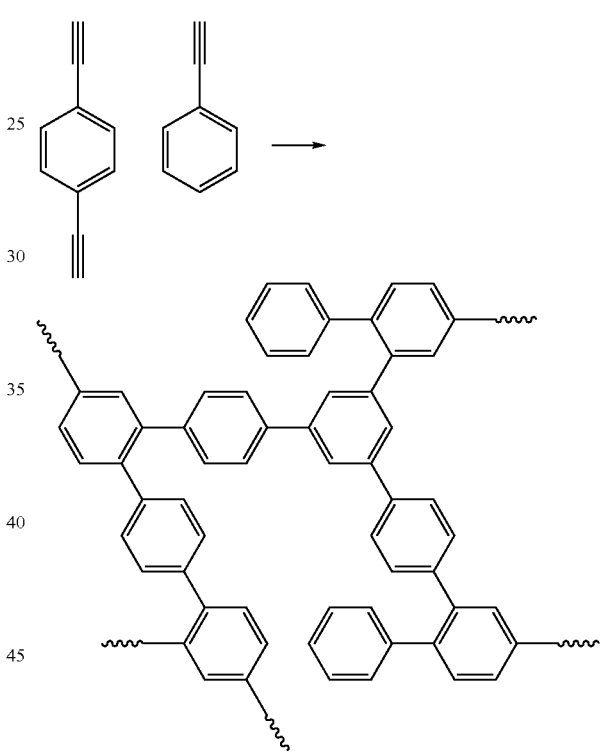

Scheme 3 represents a scheme according to the first, second and fifth embodiments of the invention where $R^1$, $R^2$ and $R^3$ are all hydrogen; m and n are both zero (so P and Q are absent); X is phenylene and Y is phenyl. It will be appreciated that Scheme 3 falls within the scope of Scheme 2, but simply specifies the nature of the X and Y groups.

Method:

To a 250 mL backed two-necked flask were added 2.36 g (10 mmol) of 1,4-dibromobenzene, 20 mg of CuI and 280 mg or dichlorobis(triphenylphosphine) palladium(ii) [$Pd(Ph_3P)_2Cl_2$]. Then 38 mL of dried $Et_3N$ was injected in under nitrogen and magnetic stirring. Yellow turbidious dispersion was formed immediately. Following by adding 3.6 mL (2.45 g, 25 mmol) of trimethylsilylacetylene. The colour was changed from yellow to deep brown. Stirring was continued at room temperature for 24 hours. A mixture of grey precipitate was formed. The precipitate was separated and washed with Et₃N slowly until its colour became white. The Et₃N solutions were collected and the solvent was removed. A black solid with some crystal-like substance was obtained. The crude product was purified through a silica gel column using hexane and dichloromethane (1:1 v/v) as eluent. The thus obtained 1,4-bis(trimethylsilylacetyl)benzene (2.25 g, 8.3 mmol) was refluxed with 5.73 g (102 mmol) of KOH in 143 mL ethanol for 6 hours. The solution was poured to 880 mL of 1 M HCl solution. Some yellow flocculates were formed, which were collected and dried. The crude product was further purified by sublimation at 90-100° C. A white powdery product 1,4-diethynylbenzene was obtained in 39% yield.

Copolymerization of the 1,4-diethynylbenzene was carried out in a dry nitrogen atmosphere by a standard Schlenk technique. To a thoroughly baked and moisture-excluded Schlenk tube, 18 mg TaCl₅ (0.05 mmol) and 21.3 mg Ph₄Sn (0.05 mmol) were added in a glovebox. The catalysts were mixed with 1.0 mL freshly distilled toluene and aged at room temperature for 15 minutes. A mixture solution of 40 mg (0.32 mmol) 1,4-diethynylbenzene with 0.1 mL (0.88 mmol) phenylacetylene in 1.4 mL toluene prepared in another dry tube was then added dropwise via a syringe over 3-5 minutes under stirring. An immediate exothermic reaction took place and the colour of the mixture changed from light yellow to dark brown. The copolymerization was allowed to continue for 6 hours. A completely soluble copolymer was obtained as a light beige powder in a yield of 76 mg (57%). TGA revealed that the copolymer is thermally stable with a 5% weight loss at 500° C.

Example 4

This example demonstrates the preparation of a diyne (4,4'-diethynylbiphenyl) followed by production of a hyperbranched polymer via copolycyclotrimerization of the diyne with a monoyne (phenylacetylene). The general reaction scheme for the polymerization reaction is the same as that shown in Example 2, except in this specific example X is 4,4'-biphenylene and Y is phenyl.

Method:

To a 250 mL two-necked flask were added 4.06 g of 4,4'-diiodobiphenyl (10 mmol), 20 mg of CuI and 280 mg of [Pd(Ph₃P)₂Cl₂]. Then 100 mL of Et₃N and 3.6 mL of trimethylsilylacetylene (2.45 g, 25 mmol) was injected subsequently. The reaction was allowed to continue at room temperature for 24 hours. The precipitate was removed by filtration and the solvent of the filtrate was evaporated. The crude intermediate, i.e. 4,4'-bis(trimethylsilylethynyl)biphenyl, was purified by column chromatography and then refluxed with 9.93 g of KOH (177 mmol) in 150 mL ethanol for 24 hours. After neutralisation with HCl solution, the precipitate was collected and the crude product was purified by column chromatography to afford 4,4'-diethynylbiphneyl as a light yellow powder. The yield was 1.692 g (55.2%).

Copolymerization was carried out in a dry nitrogen atmosphere using a standard Schlenk technique. A typical procedure for the polymerization of 4,4'-diethynylbiphenyl and phenylacetylene comprises placing 18.0 mg TaCl₅ (0.05 mmol) and 21.3 mg Ph₄Sn (0.05 mmol) in a thoroughly baked and moisture excluded Schlenk tube in a glovebox. The catalysts were mixed with 1.0 mL toluene and aged at room temperature for 15 minutes. A solution of 40.2 mg (0.199 mmol) 4,4'-diethynylbiphenyl and 0.05 mL (46.5 mg, 0.46 mmol) of phenylacetylene in 1.45 mL toluene was then added dropwise into the solution of the catalyst. After stirring at room temperature for 21 hours, the reaction was quenched by the addition of a small amount of methanol. The polymer solution was dropped into 150 mL methanol via a cotton filter under stirring. The precipitated polymer was collected, washed with methanol several times, and then dried in vacuum to give the hyperbranched polymer as a light grey powder in a yield of 44.9 mg (51.8%).

As with the previous examples, while this synthetic method has been described with relation to a specific diyne and a specific monoyne, it is equally applicable to the preparation of other diynes and to copolycyclotrimerization reactions of other monomers. For example, a process has been carried out using 1,4-diethynylbenzene as the diyne and 1-ethynylnaphthalene as the monoyne. The hyperbranched polymers produced according to this method all show high thermal stability, with 5% weight loss occurring at ~500° C. or higher.

Example 5

This example demonstrates the copolycyclotrimerization of 1,7-octadiyne with various monoynes. A number of polymers were synthesised, all according to the following reaction scheme:

SCHEME 4

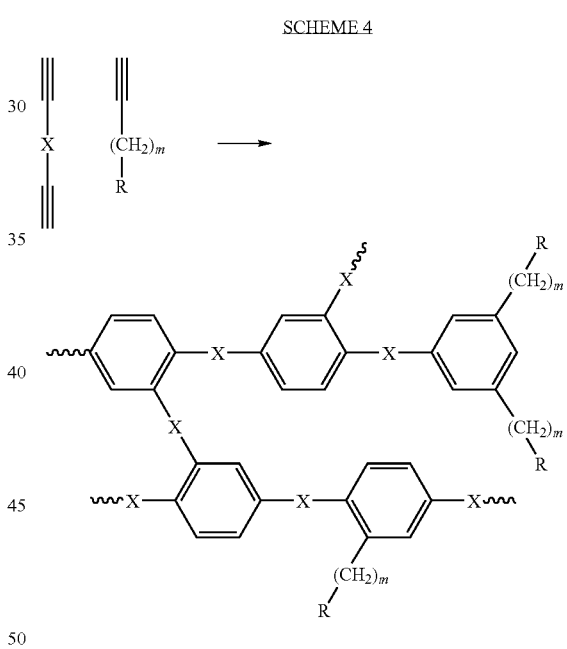

Scheme 4 is a scheme according to the first, second and fifth embodiments of the invention where $R^1$, $R^2$ and $R^3$ are all hydrogen; m and n are both zero (so P and Q are absent) and Y is a substituted alkyl group, represented by the group —(CH₂)ₘ—R. The R group was selected from carbazyl, oxynaphthalene and —OCO—C₆H₄—C₆H₄—O(CH₂)₇CH₃, and m was selected from 3, 4 or 9.

In this specific example which follows, X is —(CH₂)₄—, m is 3 and R is —OCO—C₆H₄—C₆H₄—O(CH₂)₇CH₃.

Method:

Into a thoroughly baked and moisture excluded Schlenk tube were placed 18.0 mg of TaCl₅ (0.05 mmol) and 21.3 mg Ph₄Sn (0.05 mmol) in a glovebox. The catalysts were mixed with 1.0 mL of toluene and aged at room temperature for 15 minutes. A solution of 36.0 mg (0.092 mmol) of the monoyne and 0.2 mL (160 mg, 1.51 mmol) 1,7-octadiyne in 1.3 mL toluene was then added dropwise into the catalyst solution. After stirring at room temperature for 12 hours, the reaction was quenched by the addition of a small amount of methanol. The polymer solution was dropped into 150 mL acetone via a cotton filter under stirring. The precipitated polymer was collected, washed with acetone several times, and then dried in a vacuum to give the hyperbranched polymer as a light yellow powder. The yield was 188.7 mg (96.3%).

Example 6

This example demonstrates the preparation of hyperbranched polymer using a heteroaryl-containing diyne (2,5-diethynylthiophene) and a monoyne (1-heptyne). The reaction scheme is as follows:

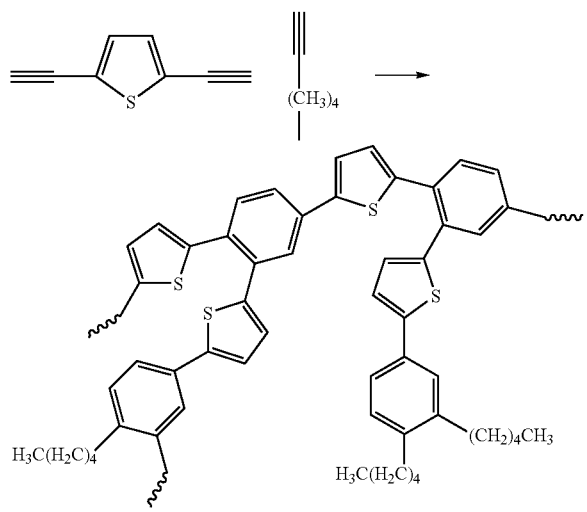

SCHEME 5

Scheme 5 is a scheme according to the first, second and fifth embodiments of the invention where $R^1$, $R^2$ and $R^3$ are all hydrogen; m and n are zero (so P and Q are absent), X is thienylene and Y is an alkyl group, —$(CH_2)_4CH_3$. It will be appreciated that Scheme 5 falls within the scope of general Scheme 2, but specifies the nature of the X and Y groups.

Method:

To a 250 mL flask were added 2.5 g of 2,5-diiodothiophene (7.44 mmol), 100 mg of CuI, and 220 mg of Pd(Ph$_3$P)$_2$Cl$_2$ under nitrogen. Then 100 mL of triethylamine (TEA) and 5.0 mL of trimethylsilylacetylene (3.40 g, 35 mmol) were injected. The reaction mixture was allowed to stir at room temperature for 12 hours. The precipitate was removed by filtration and the solvent of the filtrate was evaporated. The crude intermediate, i.e. 2,5-bis(trimethylsilylethynyl) thiophene, was purified by column chromatography and thus hydrolysed with 3 g KOH (53.6 mmol) in 70 mL methanol for 2 hours. The solution was poured into a large amount of water, and extracted with diethyl ether twice. The resultant solution was washed with water three times, dried over magnesium sulphate, and then the solvent was removed under reduced pressure to give 2,5-diethynylthiophene as a pale yellow liquid (0.71 g, 72%).

Copolymerization was carried out in a dry nitrogen atmosphere using a standard Schlenk technique. Into a thoroughly baked and moisture excluded Schlenk tube were placed 18.0 mg of TaCl$_5$ (0.05 mmol) and 21.3 mg of Ph$_4$Sn (0.05 mmol) in a glovebox. The catalysts were mixed with 1.0 mL toluene and aged at room temperature for 15 minutes. A solution of 33 mg (0.25 mmol) 2,5-diethynylthiophene and 30 μL 1-heptyne in 1.45 mL toluene was then added dropwise into the catalyst solution. After stirring at room temperature for 20 hours, the reaction was quenched by the addition of a small amount of methanol. The polymer solution was dropped into 300 mL methanol via a cotton filter under stirring to precipitate the polymer, and pouring its chloroform solution into hexane further purified the crude product. A brown powder was collected and dried under vacuum overnight. The yield was 36 mg (65.5%).

Example 7

This example demonstrates the preparation of a hyperbranched polymer from 4,4'-diethynylbiphenyl and 1-heptyne. The general reaction scheme is that used in Example 2 (Scheme 2), wherein X is 4,4'-biphenylene and Y is —$(CH_2)_4CH_3$.

Method:

Into a thoroughly baked and moisture excluded Schlenk tube were placed 18.0 mg of TaCl$_5$ (0.05 mmol) and 21.3 mg of Ph$_4$Sn (0.05 mmol) in a glovebox. The catalysts were mixed with 1.0 mL toluene and aged at room temperature for 15 minutes. A solution of 50.5 mg (0.25 mmol) of 4,4'-diethynylbiphenyl and 36 μL (0.275 mmol) of 1-heptyne in 1.45 mL toluene was then added dropwise into the solution of the catalyst. After stirring at room temperature for 20 hours, the reaction was quenched by the addition of a small amount of methanol. The polymer solution was dropped into 250 mL methanol via a cotton filter under stirring to precipitate the polymer, and pouring its chloroform solution into hexane further purified the crude product. A light yellow powder was collected and dried under vacuum overnight. The yield was 53 mg (68.9%).

Example 8

This example demonstrates the preparation of a hyperbranched polymer via copolycyclotrimerization of diynes with monoynes in the presence of a dicarbonylcyclopentadienylcobalt (CpCo(CO)$_2$) catalyst. The general reaction scheme is the same as that used in Example 2 (Scheme 2), but in the following specific reaction X is 3,6-(n-undecyl)carbazylene and Y is —$(CH_2)_9CH_3$.

Method:

Into a thoroughly baked and moisture excluded Schlenk tube was placed 46 mg (0.125 mmol) of 3,6-diethynyl-9-undecyl-9H-carbazole in a glovebox. A solution of 1-dodecyne (27 μL, 0.125 mmol) in toluene (0.223 mL) was added to the tube, followed by the addition of a solution of CpCo(CO)$_2$ (2.25 mg, 0.0125 mmol) in toluene (1.0 mL). The mixture was irradiated under stirring with a 200 W Hg lamp operating at 100V placed approximately 5 cm from the centre of the Schlenk tube. The irradiation continued for 6 hours at 65° C. The polymerization reaction was quenched by the addition of a small amount of methanol. The polymer solution was dropped into 250 mL methanol via a cotton filter under vigorous stirring to precipitate the polymer. The precipitate was redissolved in chloroform, which was poured into hexane to further purify the polymer product. After washing the precipitate with methanol, acetone, diethylether and hexane subsequently, a light yellow powder was collected, which was dried under vacuum overnight to a constant weight (66.7 mg, 100% yield).

Although this example has been described using a specific diyne and a specific monoyne, it is equally applicable to other diynes and monoynes. For example, instead of a substituted carbazylene group between the two carbon-carbon triple bonds, a fluorenylene group (e.g. 2,7-fluorenylene) or a biphenylene group (e.g. 4,4'-biphenylene) can be used. Instead of a 1-dodecyne monomer as the monoyne, phenylacetylene, 1-heptyne, —(CH$_2$)$_4$—OOC—C$_2$H$_4$—C$_2$H$_4$—O(CH$_2$)$_6$CH$_3$ or other such monomers can be used. Other possible monomers will be apparent to those skilled in the art.

Example 9

This example demonstrates the preparation of poly[phenylen-alt-2,7-fluorene]s from fluorenylene-containing diynes and aliphatic monoynes. Again, the general reaction scheme is that shown in Example 2 (Scheme 2), but in the particular Example given below X is 2,7-[9,9-bis(n-hexyl)]fluorenylene and Y is —(CH$_2$)$_9$CH$_3$.

Method:

Into a thoroughly baked and moisture excluded Schlenk tube were placed 18.0 mg of TaCl$_5$ (0.05 mmol) and 21.3 mg of Ph$_4$Sn (0.05 mmol) in a glovebox. The catalysts were mixed with 1.0 mL toluene and aged at room temperature for 15 minutes. A solution of 68.9 mg (0.318 mmol) 3,6-diethynyl-9H-fluorene and 46 µL (0.22 mmol) 1-dodecyne in 1.45 mL toluene was then added dropwise into the catalyst solution. After stirring at room temperature for 12 hours, the reaction was quenched by the addition of a small amount of methanol via a cotton filter under stirring to precipitate the polymer, and pouring its chloroform solution into hexane further purified the crude product. A light yellow powder was collected and dried under vacuum overnight. The yield was 81.1 mg (77.4%).

This method is also applicable to a wide range of other monomers. For example, we have used the method to form hyperbranched polymers from monomers such as 2,7-diethynyl-9,9-bis(n-hexyl)-9H-fluorene as the diyne and 1-octyne as the monoyne.

Examples 10 to 14

Examples 10 to 14 relate to the optical-limiting properties of the hyperbranched polymers described in the invention.

In each Example, the optical-limiting properties were measured in accordance with standard procedures. The optical limiting experiments were performed at 532 nm, using 8-ns optical pulses generated from a frequency-doubled Q-switched Nd:YAG laser (Quanta Ray GCR-3) operating in a near-Gaussian transverse mode with a repetition rate of 10 Hz. The Nd:YAG laser and other similar devices may have a bandwidth of 0.96 nm or less. The pulsed laser beam was focused onto a 1 cm square quartz cell filled with the polymer solution to be tested (dichloromethane used as solvent). Incident and transmitted energies were measured by an OPHIR detector (30-A-P-Diff-SH), and every point of the optical limiting data was the average of at least 15 laser shots.

Example 10

A hyperbranched polymer (1) was made according to the synthetic procedure described in Example 3, using 1,4-diethynylbenzene as the diyne and phenylacetylene as the monoyne.

The optical limiting behavior of the hyperbranched polymer was investigated and is shown graphically in FIG. 1. The transmitted fluence initially increased with incident fluence linearly. It started to deviate from linearity at an incident fluence of ~0.7 J/cm$^2$. In the high fluence region, the transmitted fluence reached a plateau and saturated at ~1.1 J/cm$^2$. This shows that the absorption coefficient of the solutions increases with increasing incident fluence. Thus, the hyperbranched polymer exhibits optical limiting properties.

It is known that C$_{60}$ possesses an assembly of polybenzene ring structures and is a well known optical limiting material due to its reverse saturable absorption behavior. Without wishing to be bound by theory, it is postulated that the clusters of polybenzene ring structures present in Polymer 1 may be a factor in the optical limiting properties of this polymer.

Example 11

A hyperbranched polymer (2) was prepared according to the synthetic procedure in Example 6 using 2,5-diethynylthiophene as the diyne and 1-heptyne as the monoyne.

Figure 2:
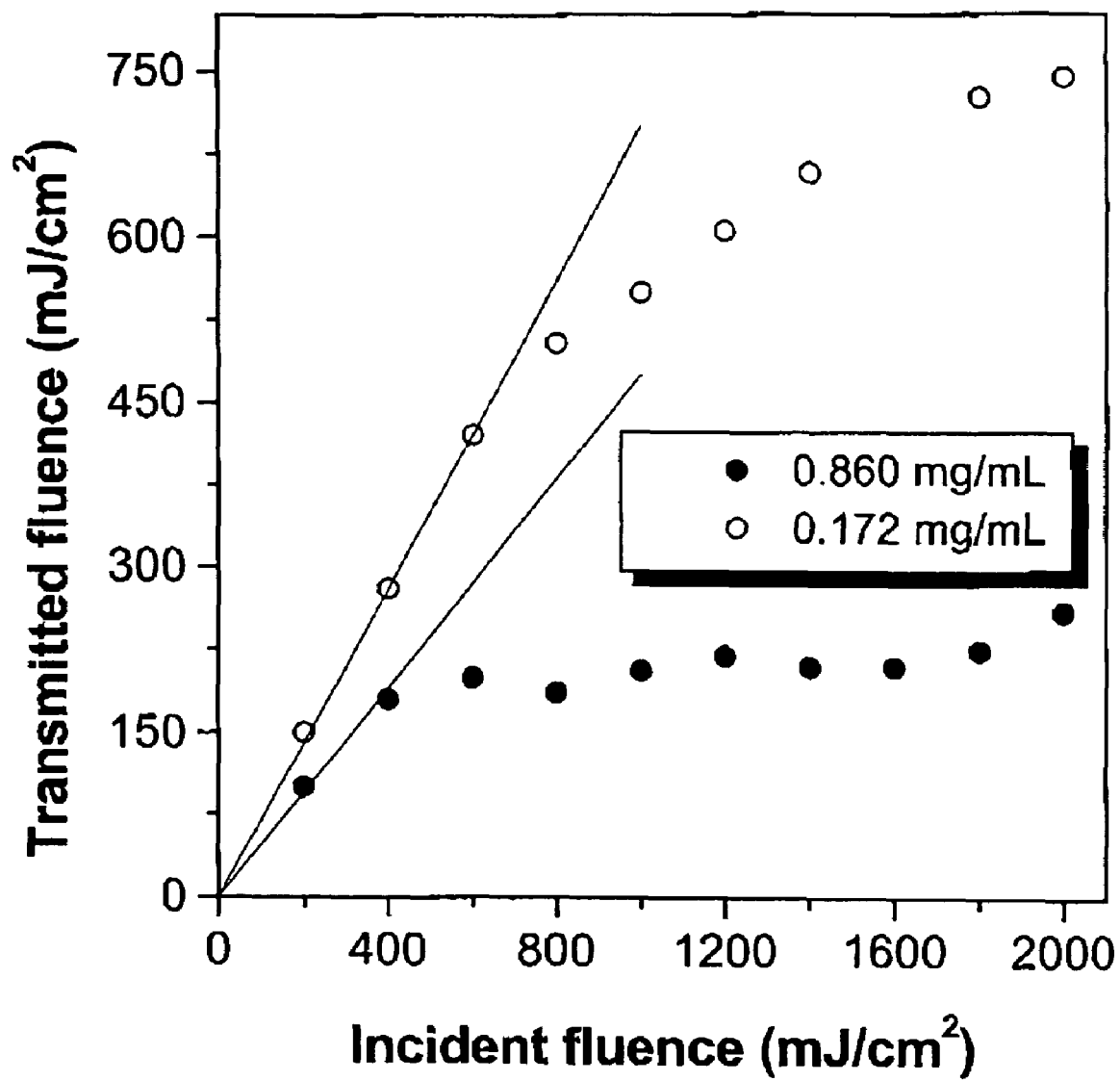

Optical limiting properties of 2 were investigated at two concentrations, 0.172 mg/mL and 0.860 mg/mL, and the results are shown in FIG. 2.

In the solution of higher concentration (0.86 mg/mL) the transmitted fluence of the sample initially elevates with a linear transmittance of 47.5%, and reaches a plateau at an incident fluence of ~400 mJ/cm$^2$. The saturated output fluence is determined to be ~220 mJ/cm$^2$. This particular polymer exhibits a better optical limiting effect than, for example, the branched oligo(phenylenes) described in earlier publication *Polymer Preprints,* 2001, 42(1) (Xu et al). Without wishing to be bound by theory, it is postulated that this enhanced optical limiting powder may be attributed to the incorporation of the thiophene ring into the polymer structure, which leads to longer effective conjugation length and higher electron density.

Example 12

Hyperbranched polymers were prepared according to the general synthetic procedures described in Examples 1 to 9 and following the general reaction scheme shown in Example 2 (Scheme 2).

Three hyperbranched polymers were synthesised, having the following X and Y groups:

| Polymer Number | X | Y |
|---|---|---|
| 3 | (para-phenylene) | —(CH$_2$)$_5$CH$_3$ |
| 4 | (4,4'-biphenylene) | —(CH$_2$)$_5$CH$_3$ |
| 5 | (2,7-fluorenylene) | —(CH$_2$)$_5$CH$_3$ |

Figure 3:
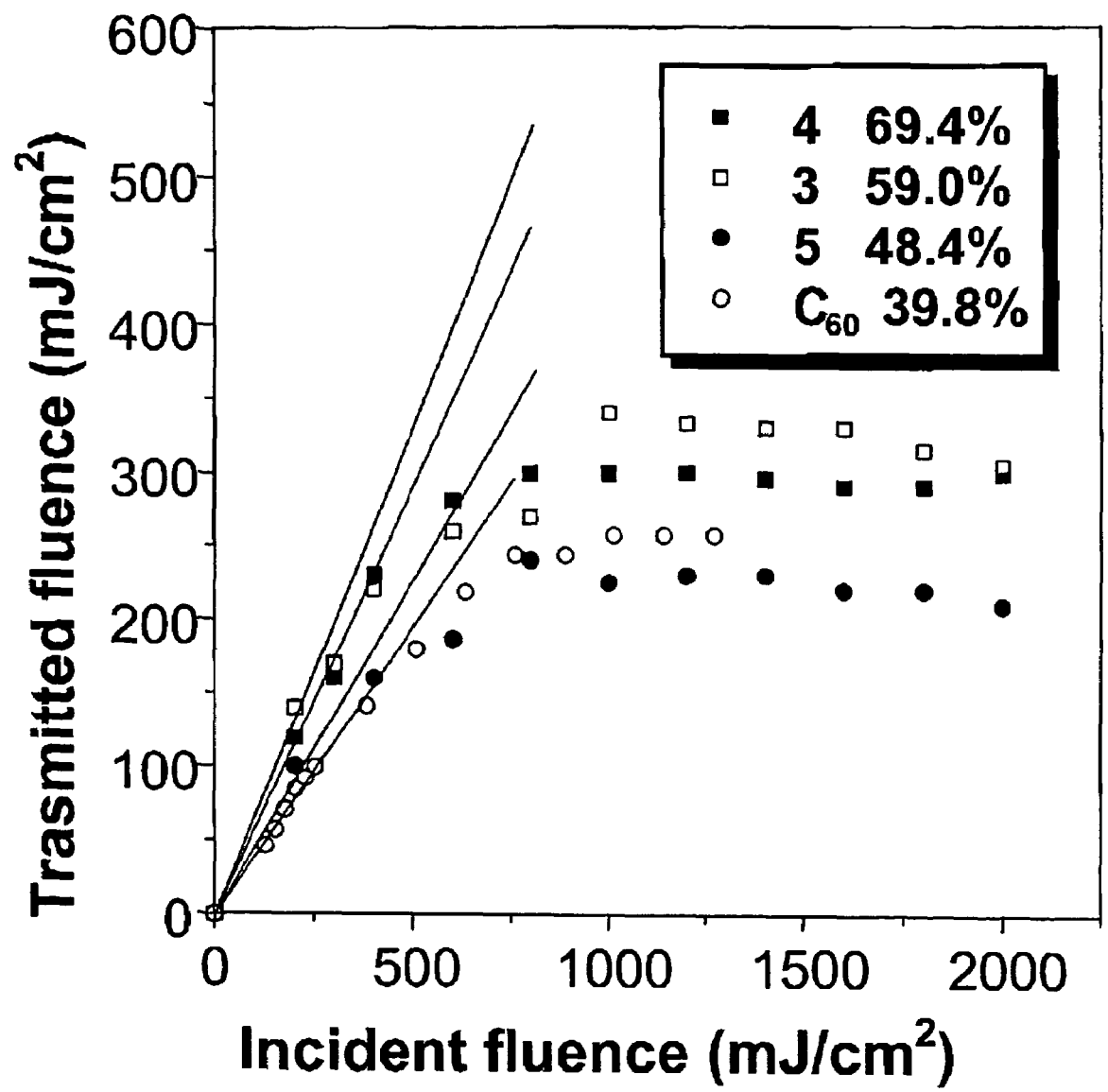

The optical limiting behavior of the hyperbranched polymers was investigated and is shown in FIG. 3. The optical limiting properties of C$_{60}$, a well-known optical limiter, are also shown in the Figure for reference. It can be seem that the transmitted fluence initially increased with incident fluence linearly. It started to deviate from linearity at an incident fluence of ~500 mJ/cm², and the transmitted fluence reached a plateau and saturated at ~200-350 mJ/cm². All the hyperbranched polymers effectively limit the 8-nm pulses of 532 nm laser light.

Example 13

Hyperbranched polymers were prepared according to the general synthetic procedures described in the earlier Examples. The general reaction scheme is the same as that given in Example 2 (Scheme 2), but using the following X and Y groups:

| Polymer Number | X | Y |
|---|---|---|
| 6 | ⟨biphenyl⟩ | —(CH₂)₄CH₃ |
| 7 | ⟨biphenyl⟩ | —(CH₂)₄LC |
| 8 | ⟨fluorene⟩ | —(CH₂)₄CH₃ | where LC represents the group:

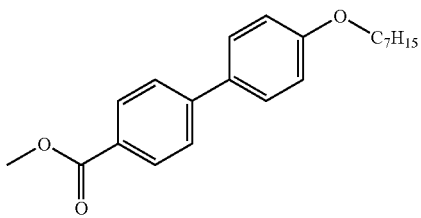

Figure 4:
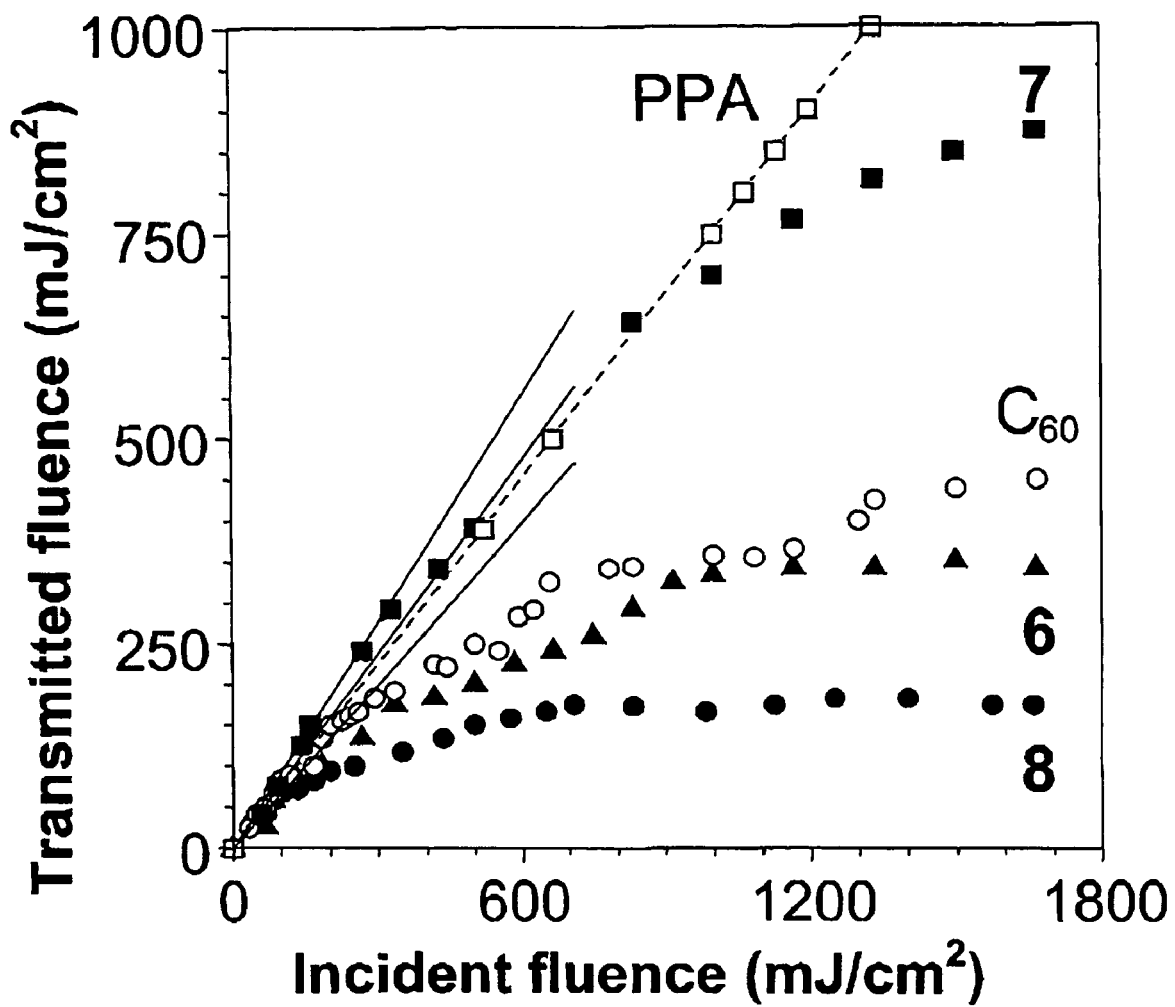

The optical limiting behavior of the hyperbranched polymers was investigated and is shown in FIG. 4. While poly (phenylacetylene (PPA) photodegrades under harsh laser shots (see *Macromolecules,* 1999, 32, 2569), polymer 6 strongly attenuated the power of intense laser light. The optical limiting power of 6 is comparable to that of C₆₀, a well-known optical limiter. When the monomers used to obtain the hyperbranched polymer were changed (see polymer 7 and polymer 8), the performance of the corresponding polymers were respectively improved and worsened, indicating that the non-linear optical properties of the polymers can be manipulated by molecular engineering.

Example 14

Hyperbranched polymers were prepared according to the general synthetic procedures described in Example 9. The general reaction scheme is the same as that given in Example 2 (Scheme 2), but using the following X and Y groups:

| Polymer Number | X | Y |
|---|---|---|
| 9 | ⟨fluorene⟩ | —(CH₂)₅CH₃ |
| 10 | ⟨fluorene⟩ | —(CH₂)₉CH₃ |

Figure 5:
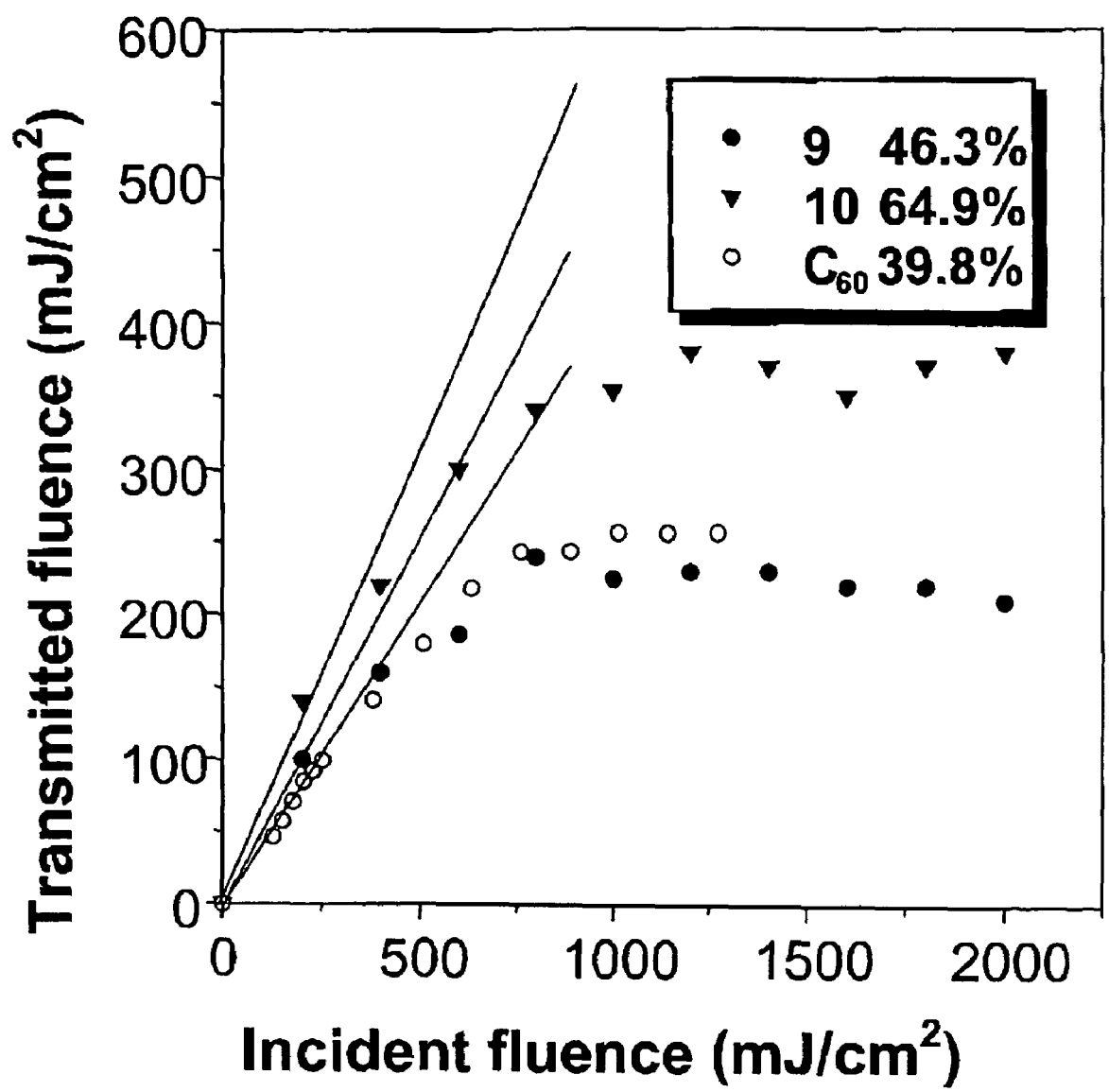

The optical limiting behavior of the hyperbranched polymers was investigated and is shown in FIG. 5. It can be seen that both polymers effectively limit the 8-ns pulses of 532 nm laser light. The transmitted fluence initially increases with incident fluence linearly. It starts to deviate from linearity at an incident fluence of ~500 mJ/cm² and the transmitted fluence reaches a plateau and saturates at ~200-350 mJ/cm². Surprisingly, polymer 9 has higher linear transmittance (T=46.3%) but a lower limiting threshold than those of C₆₀. Without wishing to be bound by theory, it is postulated that, for these specific polymers, the clusters of benzene ring structures may be a factor in providing good optical limiting properties.

Example 15

Hyperbranched polymers were prepared according to the general synthetic procedures described in Example 8. The general reaction scheme is the same as that given in Example 2 (Scheme 2), but using the following X and Y groups:

| Polymer Number | X | Y |
|---|---|---|
| 11 | ⟨biphenyl⟩ | —(CH₂)₄CH₃ |
| 12 | ⟨biphenyl⟩ | —(CH₂)₄LC* |
| 13 | ⟨fluorene⟩ | —(CH₂)₄CH₃ |
| 14 | ⟨carbazole-C₆H₁₃⟩ | —(CH₂)₄CH₃ |
| 15 | ⟨carbazole-C₁₁H₂₃⟩ | —(CH₂)₉CH₃ |

-continued

| Polymer Number | X | Y |
|---|---|---|
| 16 | 3,6-disubstituted carbazole with N-C₁₁H₂₃ | phenyl |
| 17 | 3,6-disubstituted carbazole with N-C₁₁H₂₃ | —(CH₂)₄CH₃ |
| 18 | 4,4'-biphenylene | phenyl |
| 19 | 4,4'-biphenylene | 1-naphthyl |
| 20 | 1,4-phenylene | phenyl |
| 21 | 1,4-phenylene | 1-naphthyl |

*LC is as defined in Example 13

Figure 6:
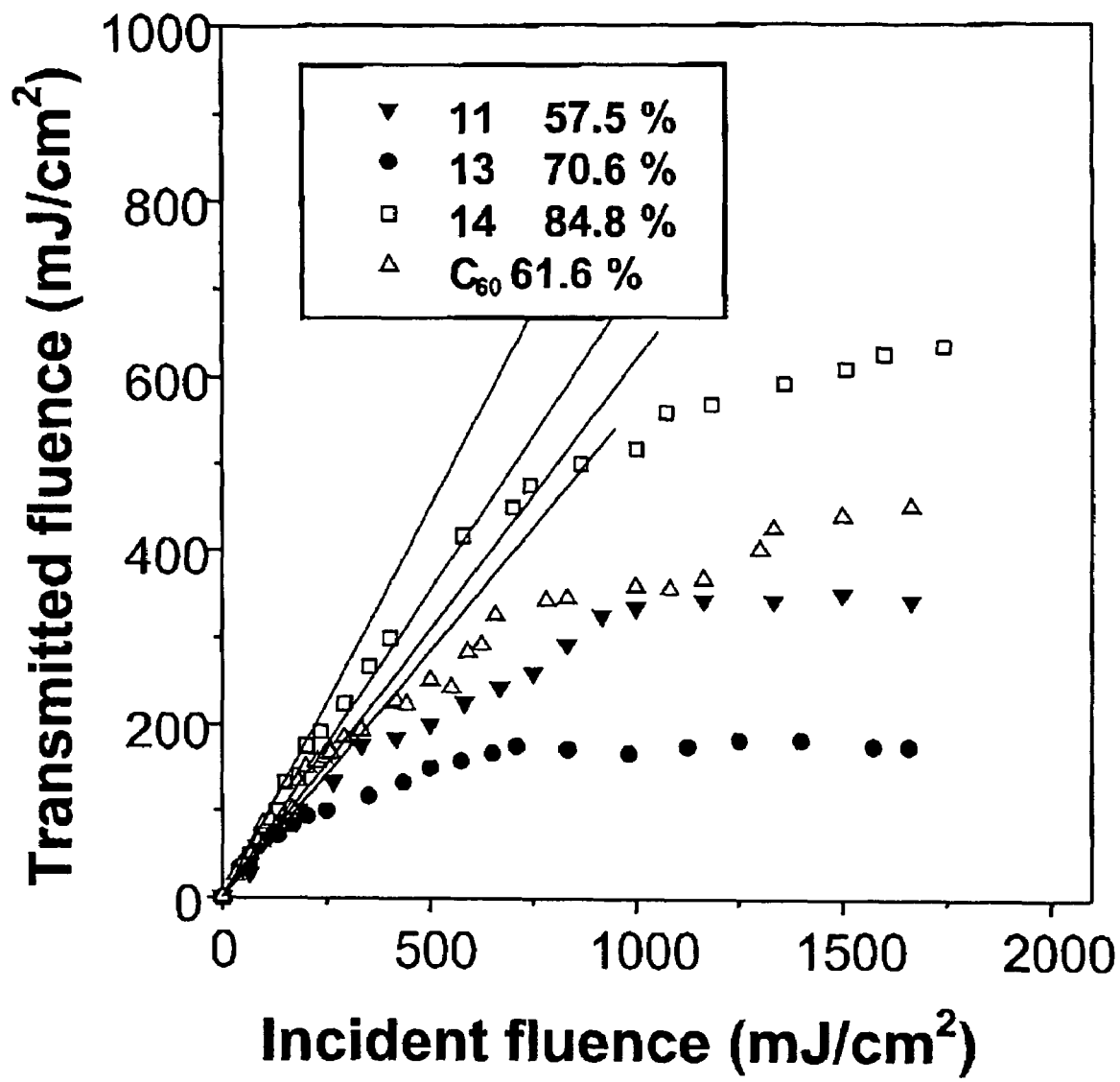
Figure 7:
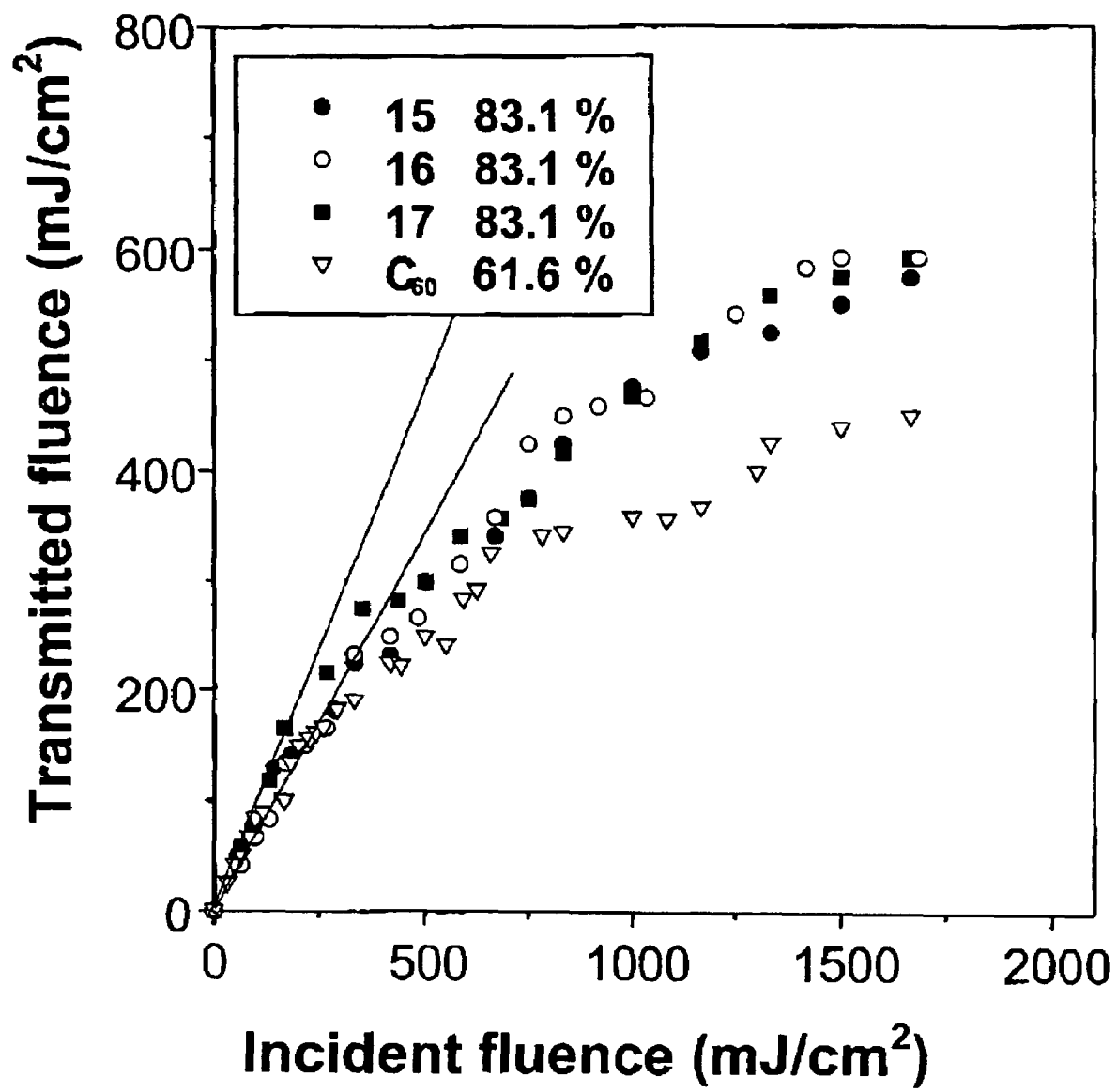
Figure 8:
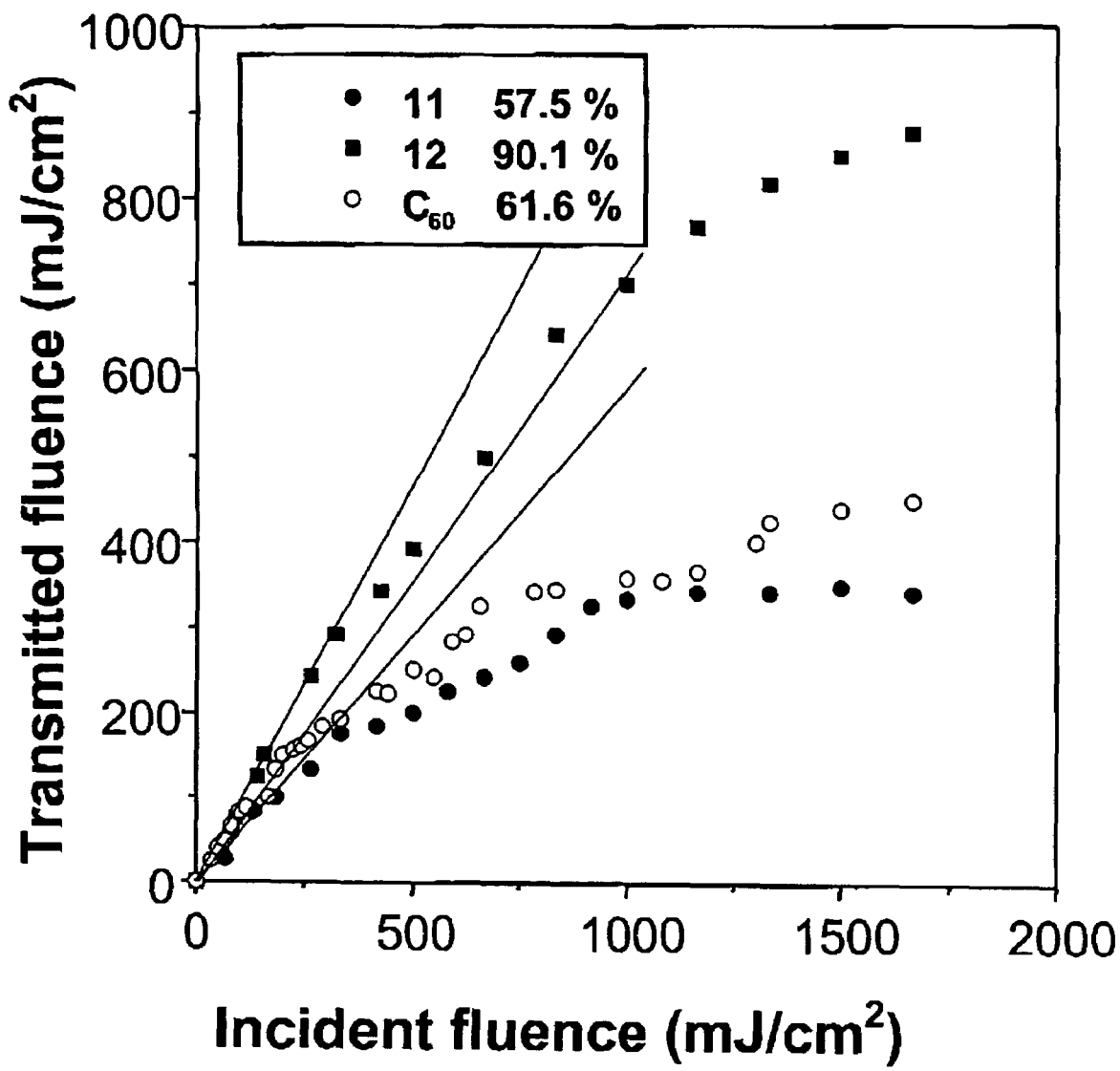

The optical limiting behavior of the hyperbranched polymers was investigated and is shown in FIGS. 6 to 8. FIG. 6 shows the optical limiting behavior of polymers 11, 13 and 14. All of the polymers effectively limit the 8-nm pulses of 532 nm laser light. The transmitted fluence initially increases with incident fluence linearly. It starts to deviate from linearity at an incident fluence of ~250 mJ/cm² and the transmitted fluence reaches a plateau and saturates at ~200-600 mJ/cm². Compared with polymers 11 and 14, polymer 13 exhibits a much better optical limiting effect, which is also far better than $C_{60}$, a well-known optical limiter. The enhanced optical limiting power of 13 may be attributed to the incorporation of fluorene groups into the polymer structure, which leads to longer effective conjugation length and higher electron density.

FIG. 7 shows the optical limiting behavior of carbazole-based polymers, with polymers 15, 16 and 17 showing similar optical limiting behavior.

FIG. 8 shows the optical limiting behavior of polymers 11 and 12, and shows that the optical limiting effect of 11 is better than that of 12.

Examples 16 to 23

Examples 16 to 23 relate to the light-emitting properties of the hyperbranched polymers described in the invention. Fluorescence spectra of the polymer solutions were recorded at room temperature in quartz cells on an SLM 8000C spectrofluorometer. Photoluminescence spectra of thin films of the polymers were obtained on a Kollmorgen Instrument PR650 photospectrometer, using a He—Ne laser generator Monichrome 56 as the excitation source.

Example 16

Figure 9:
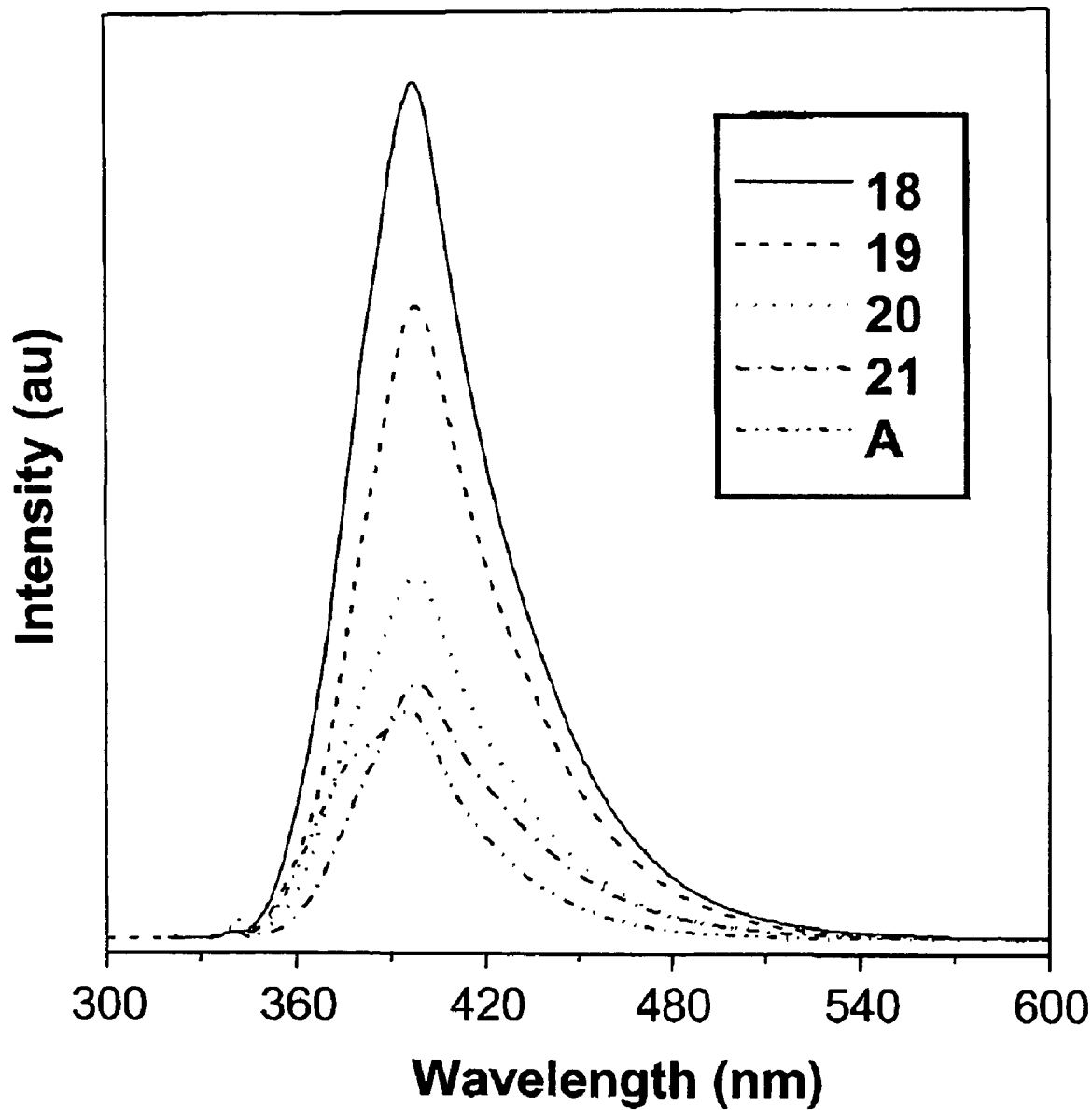
FIGS. 9-15 are fluorescence spectra (intensity vs. wavelength) showing the light-emitting properties of the hyperbranched polymers described herein, in accordance with the present invention.

Hyperbranched polymers were prepared according to the synthetic method described in Example 4. The general reaction scheme is the same as that used in Example 2 (Scheme 2), but using the following X and Y groups:

Solutions of the polymers in dichloromethane (DCM) were prepared at a concentration of 0.01 mg/mL. An excitation wavelength of 350 nm was used and the luminescence spectra of these polymers were recorded, which can be seen in FIG. 9. The fluorescence spectrum of the monomer 4,4'-diethynylbiphenyl is also shown in FIG. 9 for reference (labelled "A").

Strong fluorescence is emitted when the solutions of the polymers in DCM are excited at 350 nm, and the fluorescence intensity is much higher than that of poly(1-phenyl-1-octyne), a well-known highly fluorescent material. The fluorescence intensities of the biphenyl-based copolymers (i.e. 18 and 19) are also several times higher than those of the monomer 4,4'-diethynylbiphenyl and the phenyl based polymers (20 and 21). The excellent luminescence behavior of the biphenyl-based copolymers seems to arise from their unique structure, in which incorporation of the biphenyl chromophore by polycyclotrimerization provides an elongated and thus more coplanar, efficient conjugation bridge of polyphenylene. It is quite interesting that copolymer 18 gives stronger luminescence than copolymer 19, despite the fact that naphthalene derivatives have been known to show photoluminescence behavior superior to the benzoid counterpart. This suggests that the steric effect of the terminal 1-naphthyl group may damage the conjugation between benzene rings, making them twisted and non-coplanar.

Example 17

Hyperbranched polymers were prepared according to the synthetic method described in Example 5. The general reaction scheme is the same as that used in Example 5 (Scheme 4), but having the following X and R groups and values of m:

| Polymer Number | m | X | Y |
|---|---|---|---|
| 22 | 3 | —(CH$_2$)$_4$— | 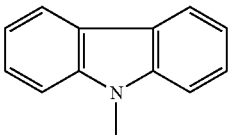 |
| 23 | 9 | —(CH$_2$)$_4$— | 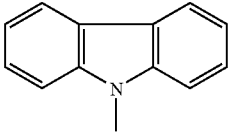 |

Figure 10:
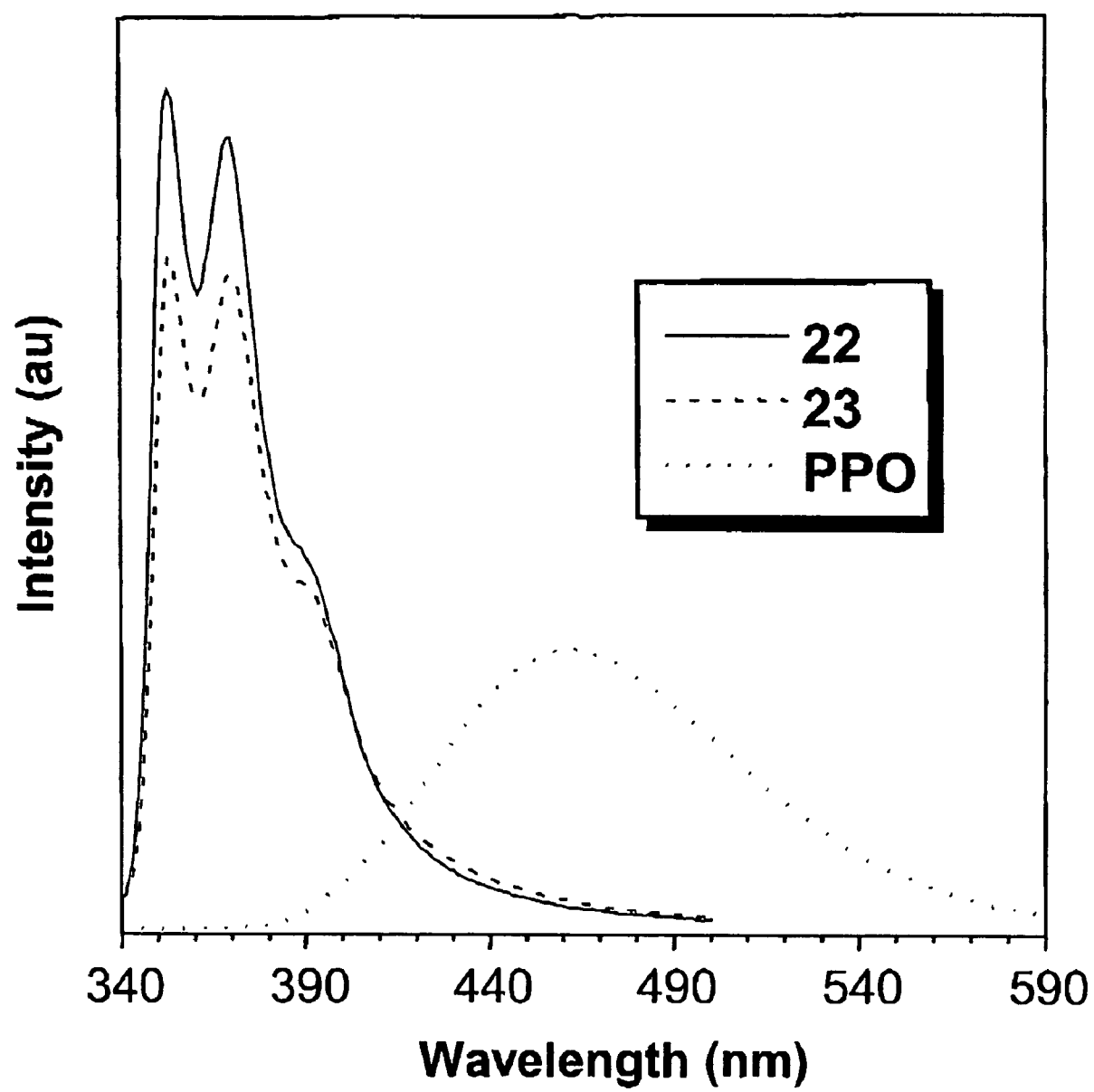

Solutions of the polymers 22 and 23, and of poly(1-phenyl-1-octyne), in dichloromethane (DCM), at a concentration of 0.06 mg/mL, were prepared. An excitation wavelength of 303 nm was used to produce the fluorescence spectra of polymers, which can be seen in FIG. 10. The spectrum of poly(1-phenyl-1-octyne) (PPO) is given for reference purposes.

Strong fluorescence is emitted when the copolymers are excited at 303 nm, and the fluorescence intensity is much higher than that of PPO, a well-known highly fluorescent material.

Example 18

Hyperbranched polymers were prepared according to the general synthetic methods described above, and in particular in accordance with Scheme 2. The particular X and Y groups used were as follows:

| Polymer Number | X | Y |
|---|---|---|
| 24 | 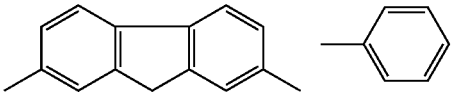 | 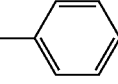 |
| 25 | 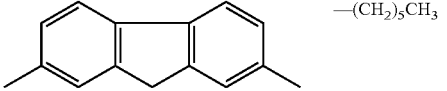 | —(CH$_2$)$_5$CH$_3$ |
| 26 | 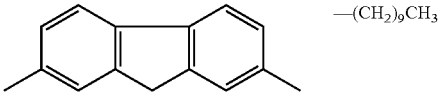 | —(CH$_2$)$_9$CH$_3$ |

Figure 11:
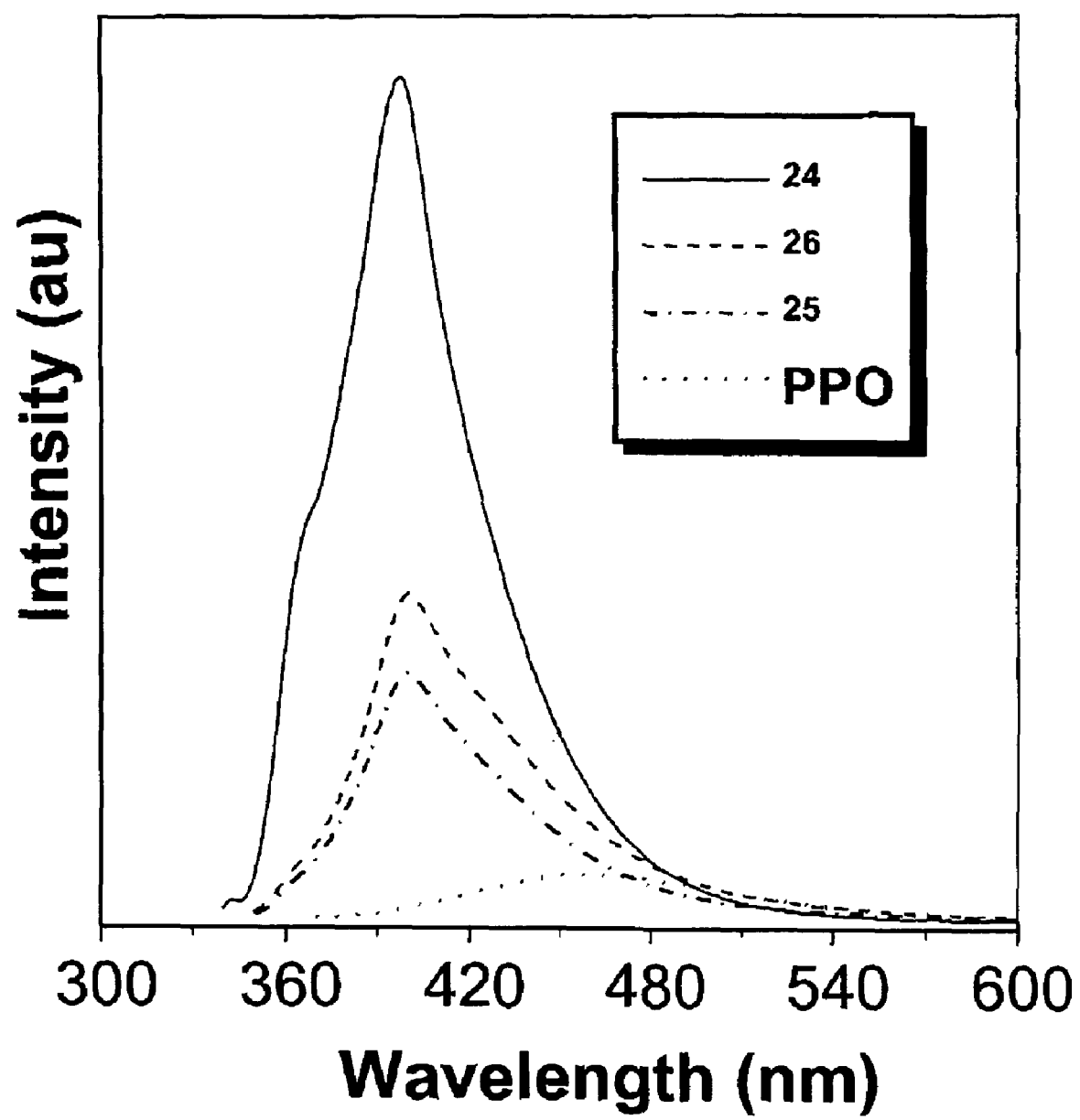

Solutions of the polymers in dichloromethane (DCM), at a concentration of 0.0025 mg/mL, were prepared. An excitation wavelength of 352 nm was used to produce the fluorescence spectra, which can be seen in FIG. 11. The spectrum for PPO is again given for reference.

Strong fluorescence is emitted when the DCM solutions of the polymers are excited at 352 nm and the fluorescence intensity is much higher than that of PPO. The fluorescence intensity of 24 with terminal phenyl group is three times higher than those of copolymers 25 and 26.

Thin films of the polymers were prepared by static casting or spin coating the solutions in solvents such as toluene and chlorobenzene onto flat non-absorbing and non-emitting substrates. The residual solvents were further expelled by annealing the polymer films at elevated temperatures under reduced pressures. The fluorescence spectra of the copolymer solutions display sharp bands at 400 nm, while for annealed film, two slightly split peaks respectively at 408 and 416 nm are observed. In comparison to the polymer solutions, the emission maximums of the cast films are less than 20 nm bathochromically shifted, and this minor shift is a sign of little aggregation formation in the solid film of 26.

Example 19

Figure 12:
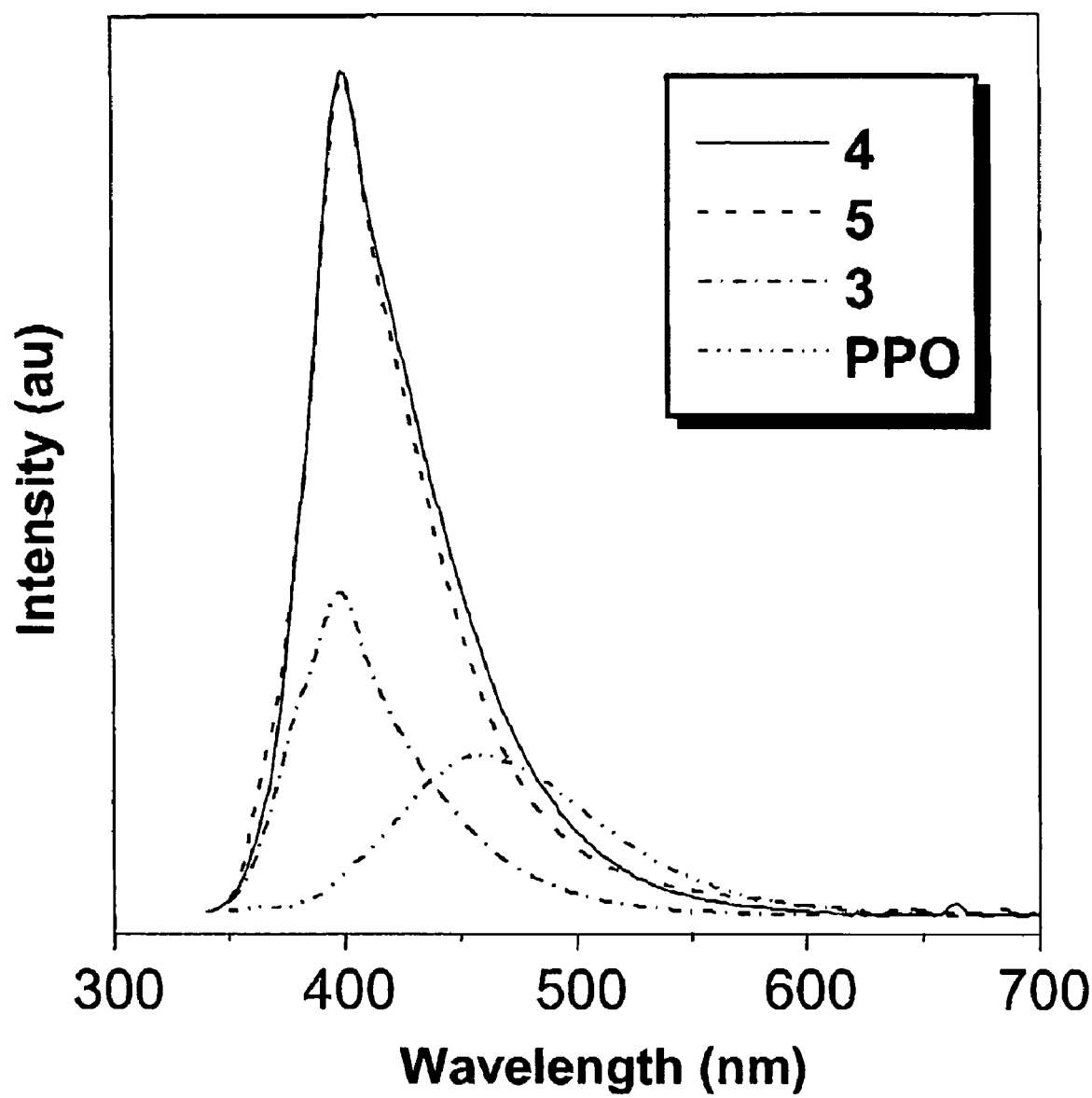

The light-emitting properties of the three hyperbranched polymers described in Example 12 (3, 4 and 5) were investigated using solutions of the polymers in dichloromethane (DCM) at a concentration of 0.0025 mg/mL. A similar solution of poly(1-phenyl-1-octyne) (PPO) was also prepared. Excitation wavelengths of 333 nm (for polymer 3), 342 nm (for polymer 4), and 352 nm (for polymer 5) were used to produce the fluorescence spectra of the polymers, which can be seen in FIG. 12.

Strong fluorescence is emitted when the DCM solutions of the copolymers are excited. The fluorescence intensities of 4 and 5 are much higher than that of PPO, a well-known highly fluorescent polyacetylene. Without wishing to be bound by theory, the excellent luminescent behavior of the copolymers may arise from their unique structure containing the biphenyl and fluorene chromophores.

Example 20

Figure 13:
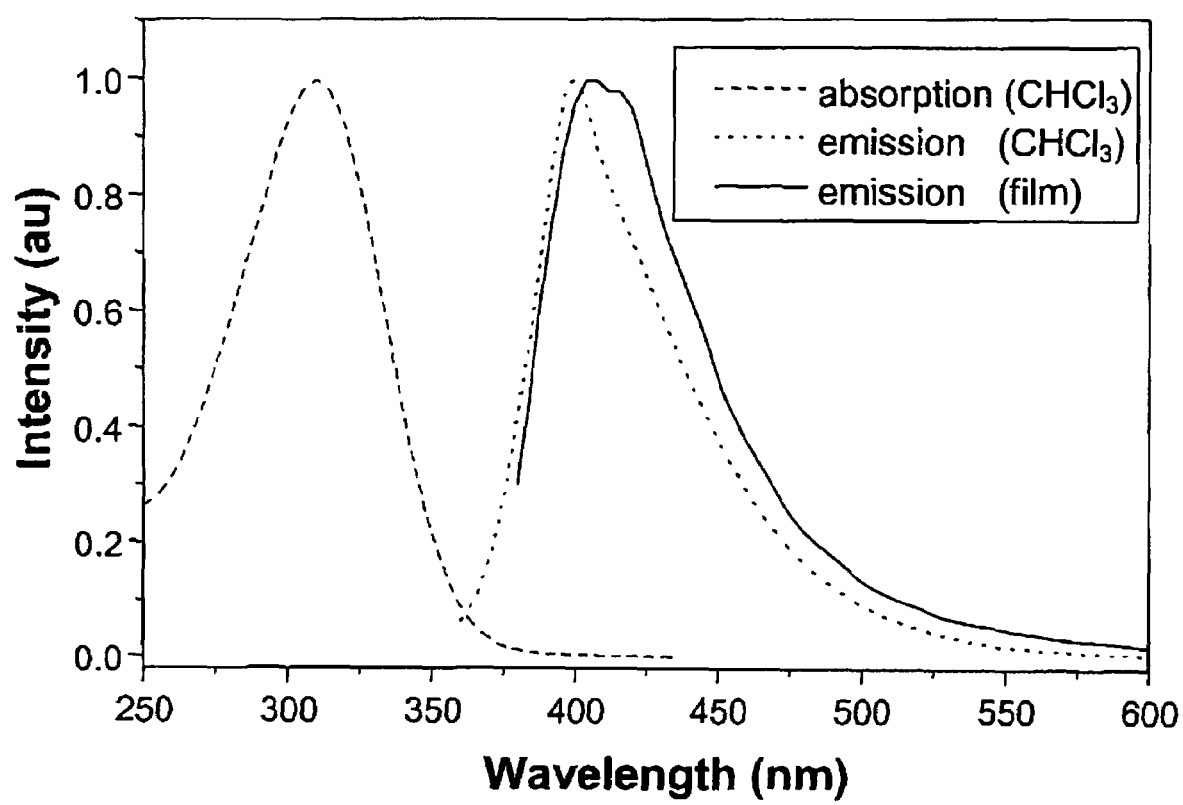

A hyperbranched polymer (27) was prepared according to the synthetic method described in Example 7, using 4,4'-diethynylbiphenyl as the diyne and 1-heptyne as the monoyne. The light-emitting properties of the polymer in chloroform were investigated, and both the absorption and the emission spectra can be seen in FIG. 13. The emission spectrum for the annealed film of polymer 27 is also shown.

It can be seen that the hyperbranched structure emits strong deep-blue light at ~400 nm. The spectrum shows a sharp band at 400 nm, while for the annealed film, two slightly split peaks at 404 and 416 nm respectively are observed. The interesting phenomenon may come from the "imperfect" hyperbranched structure of the polymer, i.e. the coexistence of dendritic and linear units, which is universally inevitable in a one step process for preparing hyperbranched polymers. In comparison to the wavelength of the polymer solution, the emission maximum at 404 nm of the casted films is only 4 nm bathochromically shifted, and this minor shift is a sign of little aggregate formation in solid states of the polymer. Undoubtedly, the dendritic units in the polymer provide a nanoenvironment for effective site isolation. Meanwhile, a 16-nm shift, contributed by the linear segments in the polymer, is still lower than those of the linear polymer counterparts with even more alkyl side chains (for example, as shown in *Prog. Polym. Sci.* 2000, 25, 1089 and *J. Am. Chem. Soc.* 2001, 123, 946).

Example 21

The light-emitting properties of the hyperbranched polymers 11, 12, 13, 14 and 17 described in Example 15 were investigated.

Figure 14:
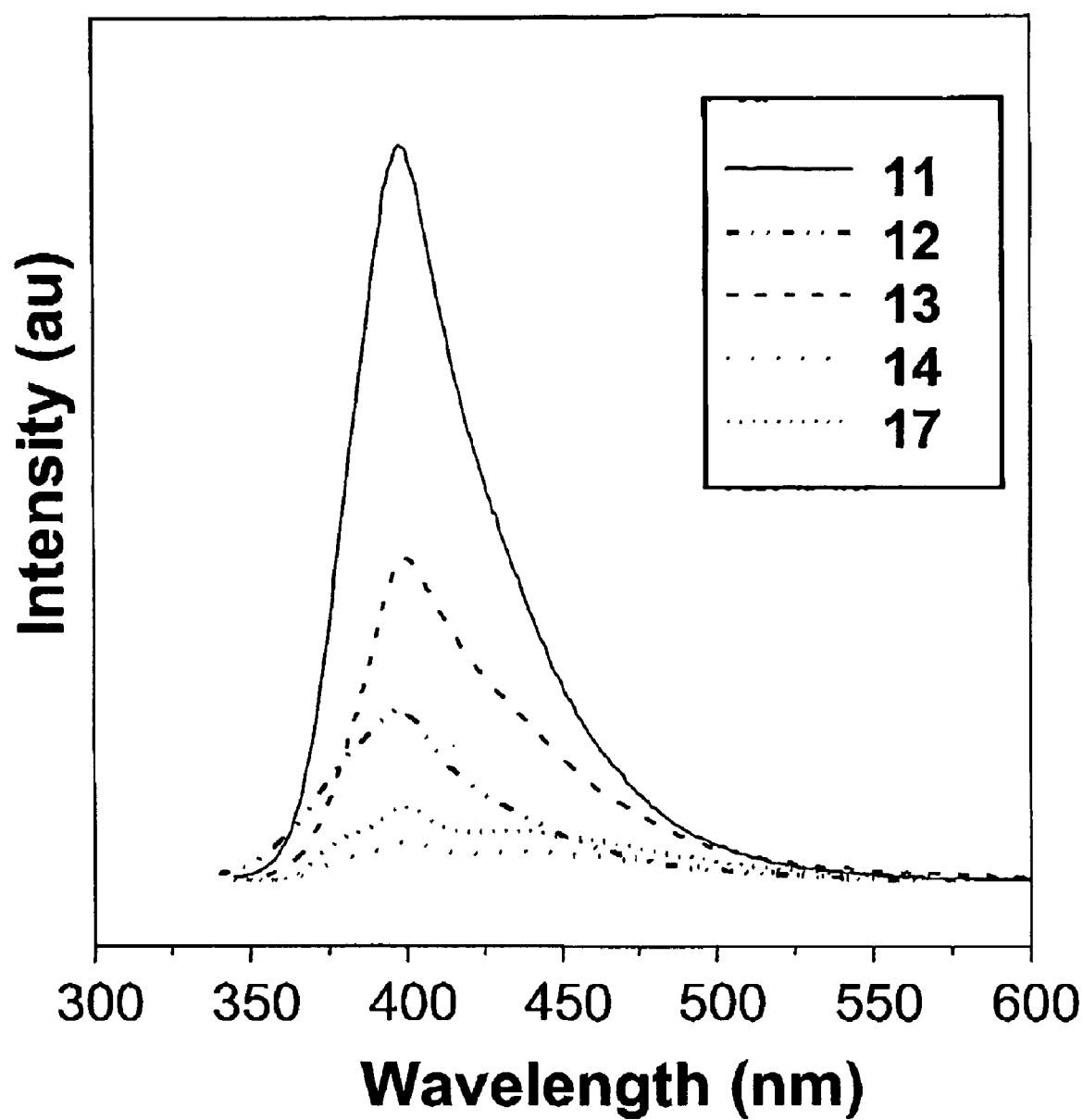

The fluorescence spectra of the resulting polymers was obtained using an excitation wavelengths of 334 nm (for polymer 12), 343 nm (for polymer 11), 347 nm (for polymers 14 and 17) and 352 nm (for polymer 13). The polymers were present in 0.002 mg/mL solutions of dichloromethane (DCM). The spectra can be seen in FIG. 14.

Strong fluorescence is emitted when DCM solutions of the copolymers 11 and 13 are excited at 343 and 352 nm. The fluorescence intensities of 11 and 13 are much higher than those of 14 and 17. Without wishing to be bound by theory, it is postulated that the luminescence behavior of these particular copolymers may arise from their unique structure containing the biphenyl and fluorene chromophores. The emission from 12 is weak, probably due to the quenching effect of the LC pendants. Correspondingly, the quantum intensities of 11 and 13 are much higher than those of 12, 14 and 17.

Example 22

Hyperbranched polymers were prepared according to the general synthetic procedures described in Example 9. The general reaction scheme is the same as that given in Example 2 (Scheme 2), but using the following X and Y groups:

| Polymer Number | X | Y |
|---|---|---|
| 28 | (fluorene) | —(CH$_2$)$_5$CH$_3$ |
| 29 | (fluorene) | —(CH$_2$)$_9$CH$_3$ |
| 30 | (fluorene with two long alkyl chains at 9-position) | —(CH$_2$)$_9$CH$_3$ |

Figure 15:
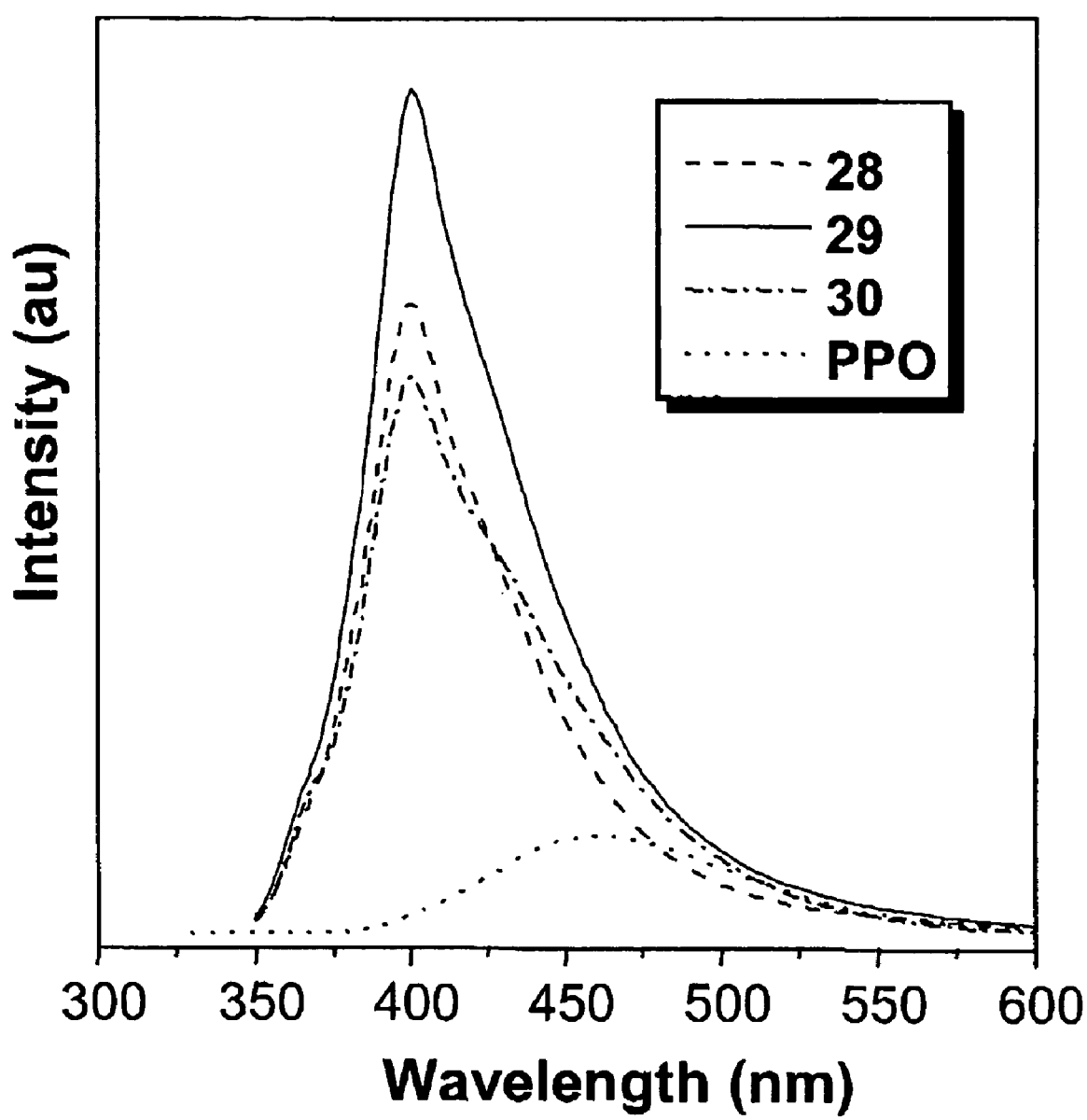

Solutions of the polymers in dichloromethane (DCM) at a concentration of 0.0025 mg/mL were prepared, and the fluorescence spectra of the polymers, as well as that for PPO, are shown in FIG. 15.

Strong deep-blue light of ~400 nm is emitted when the DCM solutions of the copolymers are excited at 352 nm. The fluorescence intensity of all polymers is much higher than that of PPO, a well-known highly fluorescent polyacetylene. The excellent luminescent behavior of these particular polymers may arise from their unique structure containing the fluorene chromophore.

Example 23

This Example demonstrates the overall suitability of the present hyberbranched polymers for synthetic applications such as light-emitting materials (LEDs) or optical limiting materials.

A number of polymers were prepared according to the general synthetic procedure outlined in Example 8. The reaction scheme is the same as that shown in Example 2 (Scheme 2), but using the following X and Y groups:

| Polymer Number | X | Y |
|---|---|---|
| 31 | (biphenyl) | —(CH$_2$)$_4$CH$_3$ |
| 32 | (biphenyl) | —(CH$_2$)$_4$LC* |
| 33 | (fluorene) | —(CH$_2$)$_4$CH$_3$ |
| 34 | (carbazole with N-C$_{11}$H$_{23}$) | (phenyl) |
| 35 | (carbazole with N-C$_{11}$H$_{23}$) | —(CH$_2$)$_4$CH$_3$ |

*LC is as defined in Example 13

The optical and thermal properties of the soluble hyperbranched polymers were investigated by the methods described in the previous Examples and the results are shown in Chart I. As shown in the chart, polymer 31 emits strong UV light at 398 nm, and has a $\Phi_F$ value (0.49) which is higher than that of poly(1-phenyl-1-octyne) (0.43), a highly luminescent disubstituted polyacetylene. The emission from polymer 32 was weaker ($\Phi_F$=0.09), which was possibly quenched by its own absorption in the same spectral region. The luminescence efficiency of other polymers also changed with the change in the combination of monomer/comonomer pairs; that is, the emission property of the polymers can be tuned by altering their molecular structures.

CHART I

| Polymer No. | Feed ratio [monoyne]/ [diyne]$^a$ | Polymer yield (wt %) | M$_w$$^b$ | M$_w$/M$_n$$^b$ | $\lambda_{em}$$^c$ (nm) | $\Phi_F$$^d$ | T$_d$$^e$ (°C.) | W$_r$$^f$ (wt %) | F$_L$$^g$ (mJ/cm$^2$) | F$_{t,m}$/F$_{i,m}$$^h$ |
|---|---|---|---|---|---|---|---|---|---|---|
| 32 | 1.3 | 76.0 | 20350 | 2.24 | 398 | 0.49 | 585 | 86.0 | 343 | 0.21 |
| 33 | 1.2 | 84.9 | 28570 | 5.78 | 397 | 0.09 | 412 | 50.3 | 900 | 0.53 |
| 34 | 2.2 | 83.5 | 16240 | 3.40 | 400 | 0.31 | 467 | 75.0 | 126 | 0.11 |

CHART I-continued

| Polymer No. | Feed ratio [monoyne]/ [diyne][a] | Polymer yield (wt %) | $M_w$[b] | $M_w/M_n$[b] | $\lambda_{em}$[c] (nm) | $\Phi_F$[d] | $T_d$[e] (°C.) | $W_r$[f] (wt %) | $F_L$[g] (mJ/cm$^2$) | $F_{t,m}/F_{i,m}$[h] |
|---|---|---|---|---|---|---|---|---|---|---|
| 35 | 1.0 | 91.8 | 6370 | 1.58 | 399 | 0.20 | 474 | 63.7 | 577 | 0.35 |
| 36 | 1.0 | 72.6 | 13420 | 2.15 | 398 | 0.10 | 404 | 83.0 | 635 | 0.36 |

[a]Molar ratio
[b]Measured by GPC in THF (polystyrene calibration)
[c]Emission maximum (in dichloromethane)
[d]Quantum yield of fluorescence (9,10-diphenylanthracene standard)
[e]Temperature for 5% weight loss (TGA, under $N_2$, heating rate: 20° C./min)
[f]Weight of residue after pyrolysis at 800° C.
[g]Optical limiting threshold (incident fluence at which nonlinear transmittance is 50% of initial linear one)
[h]Signal suppression (ratio of saturated transmitted fluence to maximum incident fluence)

Polymer 31 lost little weight at 585° C. and carbonized in high yield upon further heating. All its structural congeners 32-35 were also thermally stable. Their stabilities are similar to that of poly(p-phenylene) (stable up to ~550° C.) but different from those of polyacetylenes [e.g. poly(phenylacetylene) (PPA) and poly(1-hexyne) (PH) which start to lose weight at 220 and 150° C. respectively]. This is obviously because the polyarylenes tested in this example are structurally similar to polyphenylene (stable aromatic repeating units) but different from polyacetylene (labile polyene backbone).

With regard to optical limiting power, while PPA photodegrades under harsh laser shots, the hyperbranched polymers tested strongly attenuated the power of intense 532-nm optical pulses, and show optical limiting properties comparable to those of $C_{60}$, a well-known optical limiter. When one of the monomers was changed, the optical limiting performance was also changed, indicating that the nonlinear optical properties can be manipulated by molecular engineering. This is further verified by the data in Chart I: the limiting power of the polymers varied according to their molecular structure. Among all the polymers, 32 worked best. It limited the laser pulses at a low threshold (126 mJ/cm$^2$) and suppressed the optical signals to a great extent (0.11; Table 1, no. 4), which are respectively 2.8- and 2.5-fold better than those achievable by $C_{60}$ under comparable conditions.

The excellent optical limiting properties of the polymers, coupled with their thermal stability and processing advantages, make the hyperbranched polymers promising candidate materials for innovative high-tech applications.

Example 24

Similarly to Example 23, a number of polymers were prepared as shown in Scheme 2. The general synthetic procedure is that described in Example 2, using $TaCl_5$—$Ph_4Sn$ as the catalyst system, and using the following X and Y groups:

| Polymer Number | X | Y |
|---|---|---|
| 36 | fluorene | —(CH$_2$)$_5$CH$_3$ |
| 37 | fluorene | —(CH$_2$)$_9$CH$_3$ |
| 38 | 9,9-dialkylfluorene | —(CH$_2$)$_9$CH$_3$ |
| 39 | phenylene | —(CH$_2$)$_5$CH$_3$ |
| 40 | biphenylene | —(CH$_2$)$_5$CH$_3$ |

Again, the optical and thermal properties of the soluble hyperbranched polymers were investigated by the methods described in the previous Examples and the results are shown in Chart II.

CHART II

| Polymer No. | Feed ratio [monoyne]/ [diyne][a] | Polymer yield (wt %) | $M_w{}^b$ | $M_w/M_n{}^b$ | $\lambda_{cm}{}^c$ (nm) | $\lambda_{em}{}^d$ (nm) | $\Phi_F{}^e$ | $T_d{}^f$ (° C.) | $W_r{}^g$ (wt %) | $F_{t,m}/F_{i,m}{}^h$ |
|---|---|---|---|---|---|---|---|---|---|---|
| 36 | 1.57 | 81.9 | 41120 | 5.6 | 331 | 400 | 0.86 | 451 | 68 (892) | 0.15 |
| 37 | 1.57 | 70.1 | 72270 | 5.7 | 333 | 400 | 0.98 | 459 | 63 (900) | 0.19 |
| 38 | 1.28 | 74.1 | 93370 | 8.7 | 337 | 400 | 0.91 | 438 | 47 (909) | nd[i] |
| 39 | 1.15 | 93.7 | 37990 | 4.0 | 292 | 400 | 0.94 | 452 | 71 (750) | 0.15 |
| 40 | 1.20 | 68.9 | 183100 | 5.6 | 311 | 400 | 0.74 | 463 | 64 (900) | 0.15 |

[a]Molar ratio
[b]Measured by GPC in THF (polystyrene calibration)
[c]Measured in solution at room temperature
[d]Emission maximum (in dichloromethane)
[e]Quantum yield of fluorescence (9,10-diphenylanthracene standard)
[f]Temperature for 5% weight loss (TGA, under $N_2$, heating rate: 20° C./min)
[g]Weight of residue after pyrolysis at temperature given in pyrolysis
[h]Signal suppression (ratio of saturated transmitted fluence to maximum incident fluence)
[i]Not determined

We claim:

1. An apparatus, comprising:
a hyperbranched polymer having a property of limiting transmission of light through the hyperbranched polymer, wherein the hyperbranched polymer has a structure of the general formula:

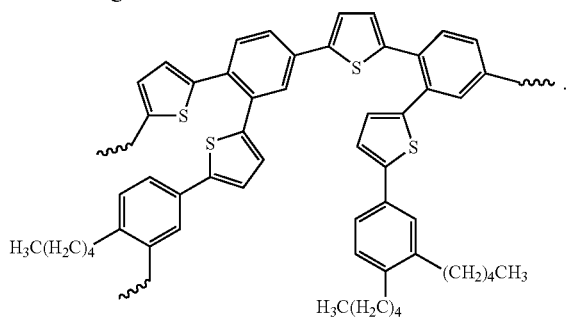

2. The apparatus of claim 1, further comprising a light source configured to emit light, wherein the hyperbranched polymer is interposed between the light source and a material to be protected from the light.

3. An apparatus, comprising:
a light source configured to emit light; and
a display including a hyperbranched polymer having a property of luminescence upon exposure to the light, wherein the hyperbranched polymer has a structure of the general formula:

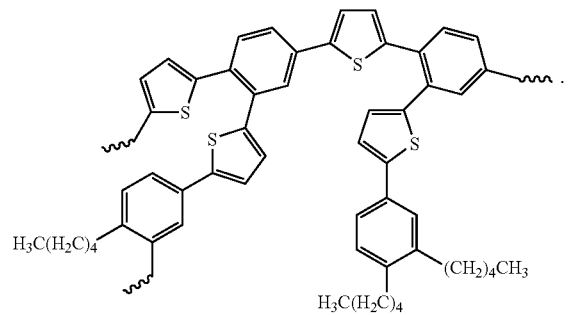

4. The apparatus of claim 3, wherein the display includes a substrate, and wherein the hyperbranched polymer is disposed on the substrate.

5. A method, comprising:
providing a first monomer having a general formula (I):

or a salt thereof;
providing a second monomer having a general formula (II):

$$Y\!=\!\!=\!\!=\!R^3 \quad (II)$$

or a salt thereof; and
polymerizing the first monomer and the second monomer to form a hyperbranched polymer;
wherein X comprises a substituent selected from a group of substituents consisting of:

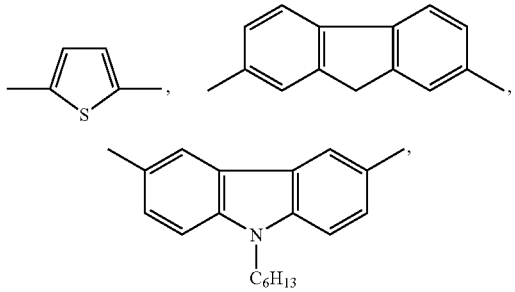

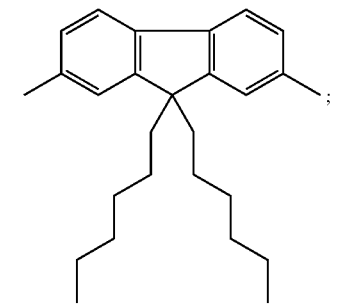

wherein $R^1$, $R^2$, $R^3$, and Y each independently comprise a substituent selected from a group of substituents consisting of linear or cyclic alkyl, linear or cyclic substituted alkyl, interrupted linear or cyclic alkyl, interrupted linear or cyclic substituted alkyl, aryl, substituted aryl, heteroaryl, and substituted heteroaryl;

wherein P and Q each independently comprise a substituent selected from a group of substituents consisting of arylene, substituted arylene, heteroarylene, substituted heteroarylene, linear or cyclic alkylene, substituted linear or cyclic alkylene, and alkenylene or substituted alkenylene of formula —$(CR^4=Z)_p$— or —$(Z=CR^4)_p$— where Z represents $CR^5$ or N, $R^4$ and $R^5$ each independently represent a hydrogen atom, an alkyl group, or a substituted alkyl group, and p≧1; and wherein m and n are independently 0, 1, 2, or 3.

6. The method of claim 5, wherein $R^1$, $R^2$ and $R^3$ comprise a substituent independently selected from a group of substituents consisting of hydrogen, $C_1$-$C_6$ alkyl groups, and interrupted $C_1$-$C_6$ alkyl groups.

7. The method of claim 5, wherein $R^1$, $R^2$, and $R^3$ comprise a substituent independently selected from a group of substituents consisting of hydrogen, methyl, ethyl, propyl, and trimethylsilyl.

8. The method of claim 5, wherein Y comprises an alkyl group, a substituted alkyl group, an interrupted alkyl group, and an interrupted, substituted alkyl group.

9. The method of claim 8, wherein Y comprises a linear alkyl group having between 1 and 20 carbon atoms and being interrupted by a group of the general formula:

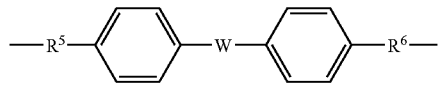

wherein W represents a carbon-carbon single bond or a group of the formula —C(O)—O— or O—C(O)—, and $R^5$ and $R^6$ independently represent —O—, —C(O)—, —C(O)—O—, —O—C(O)— or a group of the formula —C(O)—O—$(CH_2)_h$—O—$(CO)_i$— where h is an integer between 1 and 10, and where i is 0 or 1.

10. The method of claim 9, wherein Y comprises a linear alkyl group having between 1 and 20 carbon atoms and being interrupted by one of the following groups:

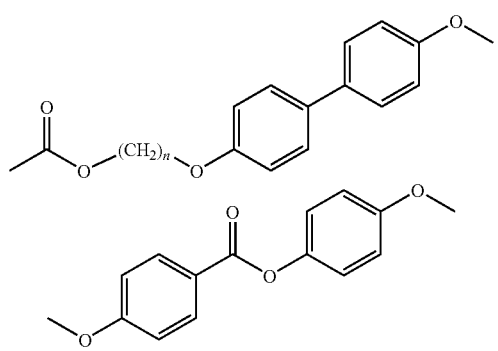

-continued

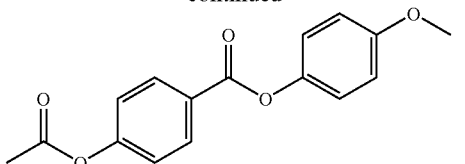

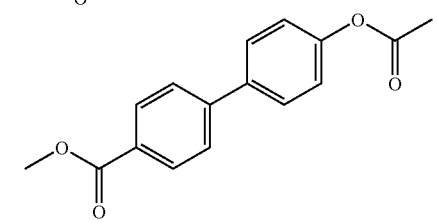

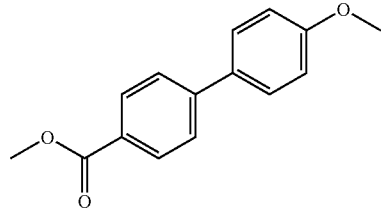

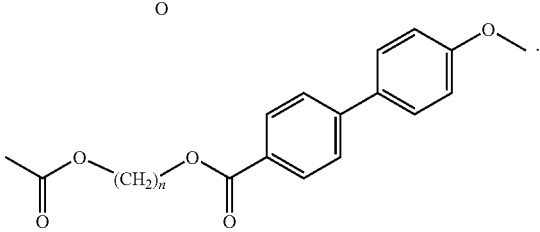

11. The method of claim 8, wherein Y comprises an uninterrupted alkyl group, or an uninterrupted, substituted alkyl group having between 3 and 10 carbon atoms in its carbon backbone.

12. The method of claim 8, wherein Y is substituted with a functional group comprising a substituent selected from a group of substituents consisting of aryl, aryloxy, and heterocyclic groups.

13. The method of claim 5, wherein Y comprises a substituent selected from a group of substituents consisting of an aryl group, a substituted aryl group, a heteroaryl group, and a substituted heteroaryl group.

14. The method of claim 13, wherein Y comprises a substituent selected from a group of substituents consisting of a phenyl, substituted phenyl, naphthyl, substituted naphthyl, fluororenyl, substituted fluororenyl, anthracenyl, substituted anthracenyl, phenanthrenyl, substituted phenanthrenyl, carbazolyl, substituted carbazolyl, thienyl, substituted thienyl, pyrrolyl, substituted pyrrolyl, pyridinyl, and substituted pyridinyl group.

15. The method of claim 14, wherein Y comprises a substituent selected from a group of substituents consisting of phenyl and naphthyl.

* * * * *

UNITED STATES PATENT AND TRADEMARK OFFICE
CERTIFICATE OF CORRECTION

PATENT NO.       : 7,659,353 B2                                            Page 1 of 1
APPLICATION NO.  : 11/088135
DATED            : February 9, 2010
INVENTOR(S)      : Tang et al.

It is certified that error appears in the above-identified patent and that said Letters Patent is hereby corrected as shown below:

Column 35
Line 12, "…— $(CR^{4=}Z)_p$—…" should read --…— $(CR^4=Z)_p$—…--.

Column 35
Line 15, "…$p \geqq 1$…" should read --…$p \geq 1$…--.

Signed and Sealed this

Thirteenth Day of April, 2010

David J. Kappos
*Director of the United States Patent and Trademark Office*